United States Patent
Itoi

(10) Patent No.: US 6,456,625 B1
(45) Date of Patent: Sep. 24, 2002

(54) LAN TELEPHONE SWITCHING SYSTEM

(75) Inventor: Yoshihiro Itoi, Kanagawa (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/049,388

(22) Filed: Mar. 27, 1998

(30) Foreign Application Priority Data

Oct. 16, 1997 (JP) .......................................... 9-283279

(51) Int. Cl.[7] .............................................. H04L 12/28
(52) U.S. Cl. ..................................................... 370/401
(58) Field of Search ................................. 370/352, 356, 370/355, 354, 353, 351, 401, 467, 496, 338, 254, 256, 465, 466; 709/226

(56) References Cited

U.S. PATENT DOCUMENTS

| | | | | |
|---|---|---|---|---|
| 5,604,737 A | * | 2/1997 | Iwami et al. | 370/352 |
| 5,621,897 A | * | 4/1997 | Boury et al. | 710/116 |
| 5,623,534 A | * | 4/1997 | Desai et al. | 455/445 |
| 5,819,045 A | * | 10/1998 | Raman et al. | 709/226 |
| 6,205,135 B1 | * | 3/2001 | Chinni et al. | 370/356 |

* cited by examiner

*Primary Examiner*—Chau Nguyen
*Assistant Examiner*—Alexander D. Boakye
(74) *Attorney, Agent, or Firm*—Katten Muchin Zavis Rosenman

(57) ABSTRACT

Speech over an analog telephone set or an internet phone device in a LAN telephone networ k is actualized by connecting internet phone devices or analog telephone sets to a LAN telephone switching apparatus. Herein, it is permitted to form a system of telephone numbers which differ from LAN addresses being unique in the LAN telephone network, so that the network telephone set can be used with the same feel as that of a conventional extension telephone. Besides, address setting for the individual analog telephone sets or internet phone devices is automatically performed. Moreover, local IP addresses being unique in the LAN telephone switching apparatus are used as IP addresses which are set for the individual sets or devices, so that the problem of the exhaustion of the number of IP addresses can be solved.

27 Claims, 32 Drawing Sheets

| TELEPHONE NUMBER | LOCAL IP ADDRESS (OR PRIVATE IP ADDRESS) | GLOBAL IP ADDRESS | TCP/UDP PORT NUMBER |
|---|---|---|---|
| 1110 | 200.200.200.10 | 100.100.100.1 | 1110 |
| 1111 | 200.200.200.11 | 100.100.100.1 | 1111 |
| 1112 | 200.200.200.12 | 100.100.100.1 | 1112 |
| 1113 | 200.200.200.13 | 100.100.100.1 | 1113 |
| 1114 | 200.200.200.14 | 100.100.100.1 | 1114 |
| 1115 | 200.200.200.15 | 100.100.100.1 | 1115 |
| 1116 | 200.200.200.16 | 100.100.100.1 | 1116 |
| 1117 | 200.200.200.17 | 100.100.100.1 | 1117 |
| 1118 | 200.200.200.18 | 100.100.100.1 | 1118 |
| 1119 | 200.200.200.19 | 100.100.100.1 | 1119 |

FIG. 4

| TELEPHONE NUMBER | GLOBAL IP ADDRESS |
| --- | --- |
| 1110 | 100.100.100.1 |
| 1120 | 100.100.100.2 |
| 1130 | 100.100.100.3 |
| 1140 | 100.100.100.4 |
| 1150 | 100.100.100.5 |
| 1160 | 100.100.100.6 |
| 1170 | 100.100.100.7 |
| 1180 | 100.100.100.8 |
| 1190 | 100.100.100.9 |
| 1200 | 100.100.100.10 |

FIG. 5

| TELEPHONE NUMBER | GLOBAL IP ADDRESS |
|---|---|
| 0000 | 100.100.100.1 |
| 1000 | 100.100.101.1 |
| 2000 | 100.100.102.1 |
| 3000 | 100.100.103.1 |
| 4000 | 100.100.104.1 |
| 5000 | 100.100.105.1 |
| 6000 | 100.100.106.1 |
| 7000 | 100.100.107.1 |
| 8000 | 100.100.108.1 |
| 9000 | 100.100.109.1 |

FIG. 6

| TELEPHONE NUMBER | GLOBAL IP ADDRESS |
|---|---|
| 2130 | 100.100.102.3 |
| 5450 | 100.100.105.5 |
| 3320 | 100.100.103.2 |
| 7810 | 100.100.107.4 |

FIG. 7

[TRANSITIONS OF INFORMATION CONTENTS IN CASE OF COMMUNICATION FROM TEL. SET"A" TO TEL. SET"B"]

| INFOR-MATION | NOS. | TEL. SET "A" | NODE "A" | | NODE "B" | | TEL. SET "B" |
|---|---|---|---|---|---|---|---|
| | | | TEL. SET SIDE | LAN NET-WORK SIDE | LAN NET-WORK SIDE | TEL. SET SIDE | |
| SOURCE | TEL. NO. | 1110 | 1110 | 1110 | 1110 | 1110 | 1110 |
| | IP ADDRESS | A-LOCAL | A-LOCAL | A | A | A | A |
| | PORT NO. | #### | #### | 1110 | 1110 | #### | #### |
| DESTI-NATION | TEL. NO. | 1120 | 1120 | 1120 | 1120 | 1120 | 1120 |
| | IP ADDRESS | A | A | B | B | B-LOCAL | B-LOCAL |
| | PORT NO. | #### | #### | 1120 | 1120 | #### | #### |

FIG. 11B

[TRANSITIONS OF INFORMATION CONTENTS IN CASE OF COMMUNICATION FROM TEL. SET"B" TO TEL. SET"A"]

| INFOR-MATION | NOS. | TEL. SET "A" | NODE "A" | | NODE "B" | | TEL. SET "B" |
|---|---|---|---|---|---|---|---|
| | | | TEL. SET SIDE | LAN NET-WORK SIDE | LAN NET-WORK SIDE | TEL. SET SIDE | |
| SOURCE | TEL. NO. | 1120 | 1120 | 1120 | 1120 | 1120 | 1120 |
| | IP ADDRESS | B | B | B | B | B-LOCAL | B-LOCAL |
| | PORT NO. | #### | #### | 1120 | 1120 | #### | #### |
| DESTI-NATION | TEL. NO. | 1110 | 1110 | 1110 | 1110 | 1110 | 1110 |
| | IP ADDRESS | A-LOCAL | A-LOCAL | A | A | B | B |
| | PORT NO. | #### | #### | 1110 | 1110 | #### | #### |

FIG. 11C

| RFC 1700 | ASSIGNED NUMBERS | OCTOBER 1994 |
|---|---|---|
| service | :tcp/udp number | : protocol/detail |
| ftp | 21/tcp | FILE TRANSFER [CONTROL] |
| ftp | 21/udp | FILE TRANSFER [CONTROL] |
| telnet | 23/tcp | TELNET |
| telnet | 23/udp | TELNET |
| smtp | 25/tcp | SIMPLE MAIL TRANSFER |
| smtp | 25/udp | SIMPLE MAIL TRANSFER |
| domain | 53/tcp | DOMAIN NAME SERVER |
| domain | 53/udp | DOMAIN NAME SERVER |
| pop2 | 109/tcp | POST OFFICE PROTOCOL - VERSION 2 |
| pop2 | 109/udp | POST OFFICE PROTOCOL - VERSION 2 |
| pop3 | 110/tcp | POST OFFICE PROTOCOL -VERSION 3 |
| pop3 | 110/udp | POST OFFICE PROTOCOL - VERSION 3 |
| nntp | 119/tcp | NETWORK NEWS TRANSFER PROTOCOL |
| nntp | 119/udp | NETWORK NEWS TRANSFER PROTOCOL |

FIG. 12

LAN TELEPHONE SWITCHING SYSTEM

BACKGROUND OF THE INVENTION

1. Field of the Invention

The present invention relates to speech communication technology in the case where a telephone network is built by accommodating existent telephone sets and internet phone devices in a computer network such as a LAN (Local Area Network) and so forth.

2. Description of the Related Art

As higher operating speeds have been required of computer systems in recent years, there is a marked tendency toward increased used of an architecture wherein a LAN is built using routers or switching hubs.

Particularly on a small-scale basis, the accommodation of computer terminals in a LAN using a small-sized router is rapidly spreading. In this regard, since a higher speed and a larger capacity have also been achieved by the network being part of a trunk line, there is an increasing demand to transfer, not only computer data, but also speech signals from telephone terminals, on the LAN.

It is therefore necessary to facilitate the introduction of an internet telephone system (internet phone) into a LAN and to realize the convenient operation of the internet phone system by effectively utilizing a limited number of LAN addresses (IP addresses).

In conventional speech communications employing telephone sets, telephone exchanges are inevitably used. When the number of telephone sets to be accommodated in a telephone network increases, exchanges of larger capacity are needed to be installed in conformity with the scale of the increase.

The internet phones to be introduced into a LAN include one offered as software which is installed in and utilized by a data terminal, one offered as a dedicated telephone set which is in the same shape as that of an ordinary analog telephone set and which has a LAN interface, and one offered as the combination of a dedicated LAN connecting device and an analog telephone set housed therein.

And, in case of constructing a telephone network wherein the internet phone devices and the analog telephone sets are connected to the LAN, LAN addresses (IP addresses) are afforded to the respective devices or sets.

Further, a party to be talked to over the internet phone is designated by any of a scheme wherein the LAN address (IP address) and a domain name are used as they are, a scheme wherein a number registered and managed on the internet phone side beforehand is dialed, and so forth.

Meanwhile, apparatuses each of which accommodates a plurality of terminals therein are a repeater hub, a switching hub, a router, etc. The repeater hub electrically repeats communication signals in order to accommodate a plurality of terminals in a single network, and it does not convert or translate addresses. The switching hub is endowed with the function of accommodating a plurality of networks, in addition to the function possessed by the repeater hub, and it can also enhance security as well as a degree of load distribution among the networks, but it does not translate addresses. The router has the function of determining the sending path of each communication packet in accordance with a destination (or source) network address (IP address) affixed to the communication packet and then delivering the communication packet to the determined path, but basically it does not translate addresses. Although some recently developed remote routers include the built-in function of replacing a local address (private address) with a global address, none of them has the function of mapping a telephone number system and a network address (IP address) system each other.

Accordingly, in the case where the telephone network is built on the LAN on the basis of the prior art as stated above, there are the problems that address management becomes complicated and that the effective utilization of the LAN addresses (IP addresses) and the reutilization of the telephone sets become difficult.

SUMMARY OF THE INVENTION

The present invention has been made with the above background, and it has for its objects to minimize the number of required LAN addresses (IP addresses) and permit the formation of a system of telephone numbers being different from the LAN addresses and being unique in a telephone network, even in a case where the telephone network is built by connecting pluralities of analog telephone sets and internet phone devices to a LAN, and to realize the labor saving of an operational control job even in a case where additional telephone sets and devices constituting a LAN telephone switching system are installed, or where any of them is removed.

The first and second aspects of the present invention are premised on a LAN telephone switching apparatus (LAN telephone switching apparatus 101 in FIG. 1 of the accompanying drawings) which serves to incarnate a LAN telephone switching network on a computer network (LAN 102 in FIG. 1).

The first aspect of the present invention has the following construction:

First of all, a first network interface circuit (internet phone/data terminal accommodation module 312 in FIG. 3B) accommodates therein a network telephone set (internet phone set 313 in FIG. 3B) which has a telephone function, and which can communicate a speech signal in a state where it is stored in packets to be transferred on the computer network.

A first telephone number/network address setting circuit (address control module 320 in FIG. 3B) correspondingly sets a telephone number and a network address which are unique on the LAN telephone switching network, for the first network interface circuit.

A first packet communication circuit (address unit 307 and table unit 306 in FIG. 8B) converts the telephone number designated by the network telephone set to the corresponding network address and vice versa, and it communicates the packets containing the network address between the computer network and the first network interface circuit.

Owing to the above construction of the first aspect of the present invention, the network telephone set is permitted to join in the LAN telephone network, and speech over the network telephone set is actualized in the LAN telephone network. Herein, it is possible to form a system of telephone numbers which are different from LAN addresses and which are unique in the LAN telephone network, so the network telephone set can be used with the same feel as that of a conventional extension telephone.

Further, since the first telephone number/network address setting circuit automatically performs the address setting for the first network interface circuit, the reutilization etc. of the network telephone set are facilitated.

The above construction of the first aspect of the present invention can be so contrived that the first network interface circuit accommodates data terminal equipment besides the network telephone set, and that the first telephone number/network address setting circuit sets only one network address for the first network interface circuit. Owing to this contrivance, the illicit installation of any network telephone set can be prevented.

Also, the above construction of the first aspect of the present invention can be so contrived that the first telephone number/network address setting circuit sets a local network address (local IP address) being unique only in the LAN telephone switching apparatus in which it is included, for the first network interface circuit, and further comprises a first network address conversion circuit (address unit 307 and table unit 306) for converting the local network address to a global network address which the LAN telephone switching apparatus possesses uniquely on the computer network, and vice versa, in the packets which are communicated by the first packet communication circuit. Owing to the contrivance, the problem of the exhaustion of the number of IP addresses can be solved.

The second aspect of the present invention has the following construction:

A second network interface circuit (analog telephone accommodation module 310 in FIG. 3B) accommodates therein an analog telephone set (analog telephone set 311 in FIG. 3B) having an analog telephone function, and it gives the analog telephone set a telephone number being unique on the LAN telephone switching network.

A signal conversion circuit (for example, A/D conversion module 309 in FIG. 3B) converts an analog speech signal to digital speech data which are communicated by the second network interface circuit, and vice versa, and it disassembles/assembles packets which contain the digital speech data and which are transferred on the computer network.

A second telephone number/network address setting circuit (address unit 307 and table unit 306) correspondingly sets the telephone number and a network address being unique on the LAN telephone switching network, for the signal conversion circuit, the telephone number being given by the second network interface circuit connected to the signal conversion circuit.

A second packet communication circuit (address unit 307) converts the telephone number designated by the analog telephone set to the network address corresponding thereto, and vice versa, and it communicates the packets containing the network address between the computer network and the signal conversion circuit.

Owing to the above construction of the second aspect of the present invention, as in the case of the construction of the first aspect of the present invention, the analog telephone set is permitted to join in the LAN telephone network, and speech over the analog telephone set is actualized in the LAN telephone network. Herein, it is provided to form a system of telephone numbers which are different from LAN addresses and which are unique in the LAN telephone network, so the analog telephone set can be used with the same feel as that of a conventional extension telephone.

Further, since the second telephone number/network address setting circuit automatically performs the address setting for the signal conversion circuit, the reutilization etc. of the analog telephone set are facilitated.

The above construction of the second aspect of the present invention can be so contrived that the second telephone number/network address setting circuit sets a local network address being unique only in the LAN telephone switching apparatus in which it is included, for the signal conversion circuit, and further comprises a second network address conversion circuit for converting the local network address to a global network address which the LAN telephone switching apparatus possesses uniquely on the computer network, and vice versa, in the packets which are communicated by the second packet communication circuit. Owing to this contrivance, the problem of the exhaustion of the number of IP addresses can be solved as in the case of the construction of the first aspect of the present invention.

The third and fourth aspects of the present invention are premised on a LAN telephone switching system which is constructed by the LAN telephone switching apparatuses as stated above.

The third aspect of the present invention has the following construction:

The LAN telephone switching system comprises a function (group table which is controlled by an address control module 320 in FIG. 3B) of giving each of the LAN telephone switching apparatuses a group of telephone numbers which are unique on the LAN telephone switching network, and a global network address which is unique on the computer network.

Also, the system comprises a function (address unit 307 and table unit 306) of communicating packets which correspond to specified network telephone sets and analog telephone sets, between the LAN telephone switching apparatuses by the use of the groups of telephone numbers and the global network addresses.

Owing to the construction of the third aspect of the present invention, it is permitted to establish communications between the specified network telephone sets and analog telephone sets which are accommodated in the different LAN telephone switching apparatuses within the computer network.

The above construction of the third aspect of the present invention can be so contrived that, when the LAN telephone switching apparatus constituting the LAN telephone switching network has been installed on the computer network anew, it is possible to report information items of the group of telephone numbers and the global network address correspondent to the installed LAN telephone switching apparatus to the other LAN telephone switching apparatuses successively. Owing to this contrivance, the dynamic addition of the LAN telephone switching apparatus is permitted and it is realized to save the labor of the operational control job of the LAN telephone switching system.

Also, the above construction of the third aspect of the present invention can be so contrived that, when a LAN telephone switching apparatus constituting the LAN telephone switching network has been removed from the computer network, it is possible to report information items of the group of telephone numbers and the global network address corresponding to the removed LAN telephone switching apparatus to the other LAN telephone switching apparatuses successively. Owing to this contrivance, the dynamic removal of a LAN telephone switching apparatus is permitted, and it is realized to save the labor of the operational control job of the LAN telephone switching system.

The fourth aspect of the present invention has the following construction:

First of all, the LAN telephone switching system comprises a function (routing table which is controlled by the address control module 320) of dividing the LAN telephone switching apparatuses constituting the LAN telephone switching system, into a plurality of groups.

Next, the system comprises a function (address unit 307 and table unit 306) of establishing communication of packets corresponding to specified network telephone sets and analog telephone sets between the groups, by accessing the LAN telephone switching apparatus which is set as a master in each of the groups.

Owing to the construction of the fourth aspect of the present invention, any of the analog telephone sets and network telephone sets which are accommodated in any of the LAN telephone switching apparatuses 101 (nodes) belonging to the LAN telephone switching system can freely communicate with any of the analog telephone sets and network telephone sets which are accommodated in the same node, or in another node within the same group, or in a different group, by the use of telephone numbers which are unique in. the system.

The above construction of the fourth aspect of the present invention can be contrived so that the master in each group is dynamically altered in accordance with a state of the communication. Owing to this contrivance, a load on searching for a telephone number on the LAN telephone switching network can be distributed over the whole network, and the reliability of a search function as the switching network can be enhanced.

BRIEF DESCRIPTION OF THE DRAWINGS

Other objects and features of the present invention will be readily understood by one skilled in the art from the description of the preferred embodiments of the invention when read in conjunction with the accompanying drawings, wherein:

FIG. 4 is a diagram showing the data construction of a local table;

FIG. 5 is a diagram showing the data construction of a group table;

FIG. 6 is a diagram showing the data construction of a routing table;

FIG. 7 is a diagram showing the data construction of a direct table;

FIGS. 11A to 11C are diagrams for explaining the transitions of the information contents of IP addresses and port numbers during communication;

FIG. 12 is a diagram showing part of [WELL KNOWN PORT NUMBERS] stipulated by "RFC (Request For Comment) 1700";

DESCRIPTION OF THE PREFERRED EMBODIMENTS

Now, the preferred embodiments of the present invention will be described in detail with reference to the drawings.

Fundamental Construction of the Preferred Embodiments of the Invention

Figure 1:
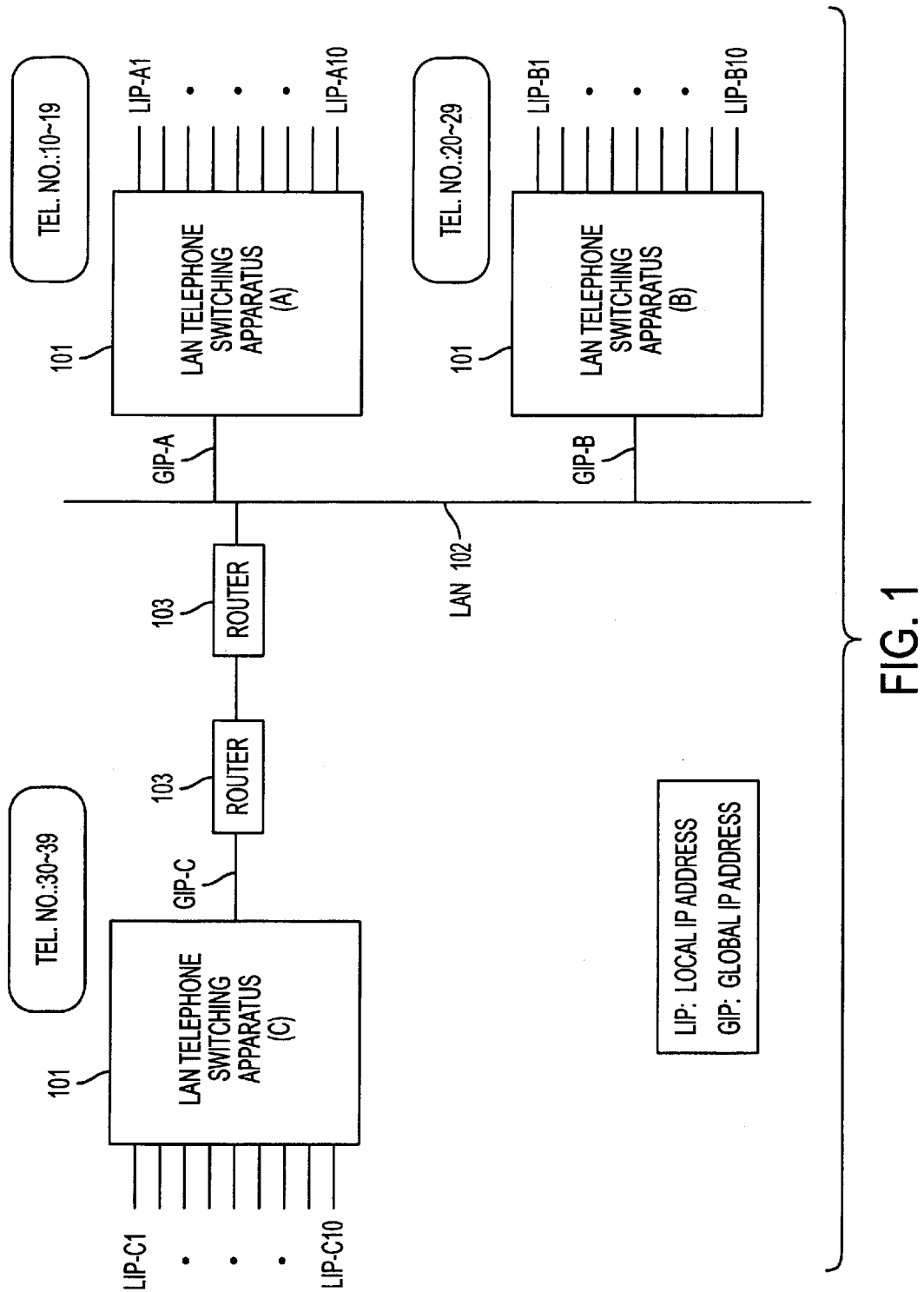
FIG. 1 is a schematic diagram showing the system architecture of one preferred embodiment of a LAN telephone switching system according to the present invention.

FIG. 1 is a block diagram showing the system architecture of one preferred embodiment of the present invention.

LAN telephone switching apparatuses 101 are connected to a LAN (local area network) 102 which is constructed of a computer network such as the Ethernet. The LAN telephone switching apparatuses 101 are interconnected, not only through the LAN 102, but also via a plurality of routers 103 or the likes. In a case where a large-scale LAN telephone network is built, a LAN telephone switching system. is administered in units of groups as will be explained later. The single LAN 102, or a plurality of LANs 102 interconnected by a router 103, is/are administered by the same organization. A WAN (wide area network) may well be interposed between routers 103.

In FIG. 1, each LAN telephone switching apparatus 101 accommodates analog telephone sets and internet phone devices therein within one group sharing an identical number table, thereby to permit the communication between the analog telephone sets or internet phone devices which are accommodated in the same LAN telephone switching apparatus 101 or the different LAN telephone switching apparatuses 101.

Figure 2:
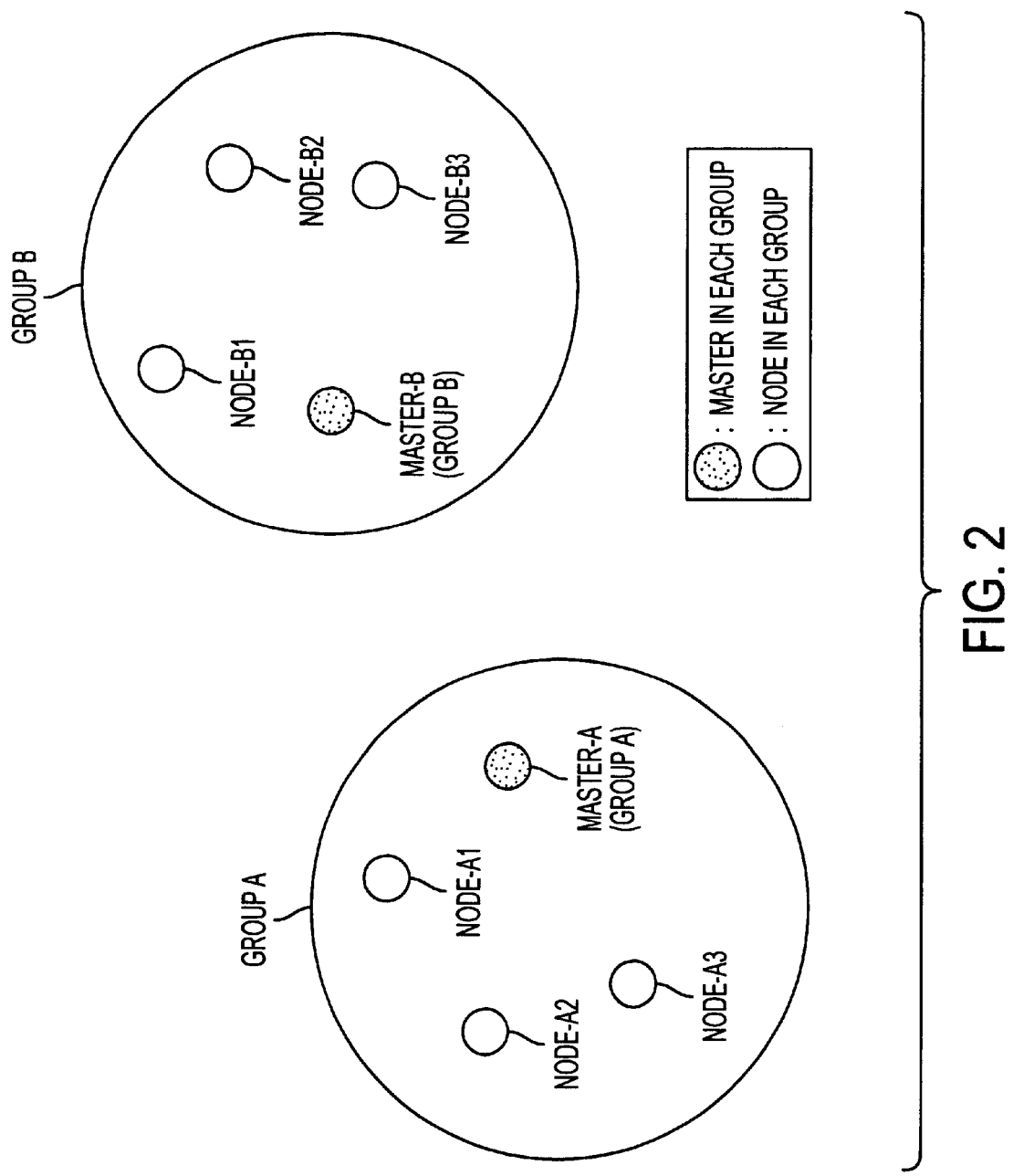
FIG. 2 is a diagram showing the group layout of the LAN telephone switching system according to the present invention.

The case where the large-scale telephone network is built by the use of the LANs, is as illustrated in FIG. 2. In the communication between the groups having different number tables (not especially shown), the LAN telephone switching apparatus 101 which representatively makes information available within each of the groups is positioned as a master, and the LAN telephone switching apparatuses 101 which are not the master within each of the groups are positioned as nodes. The master and the nodes take partial charge of switching functions in the LAN telephone network.

Tables, to be explained later, for managing the corresponding relationships between telephone numbers and LAN addresses (IP addresses) are stored in each master or each node.

Figure 3A:
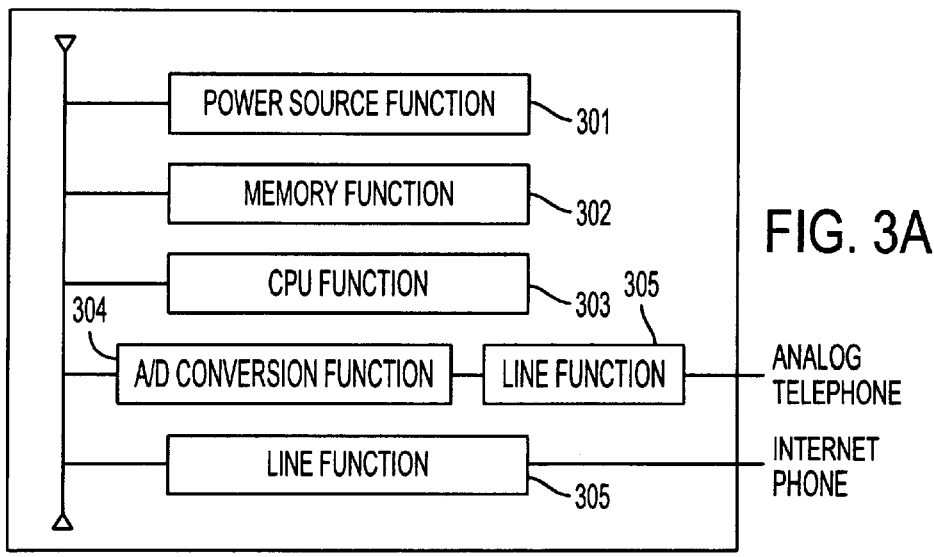
FIGS. 3A and 3B are block diagrams showing the construction of one preferred embodiment of a LAN telephone switching apparatus according to the present invention.
Figure 3B:
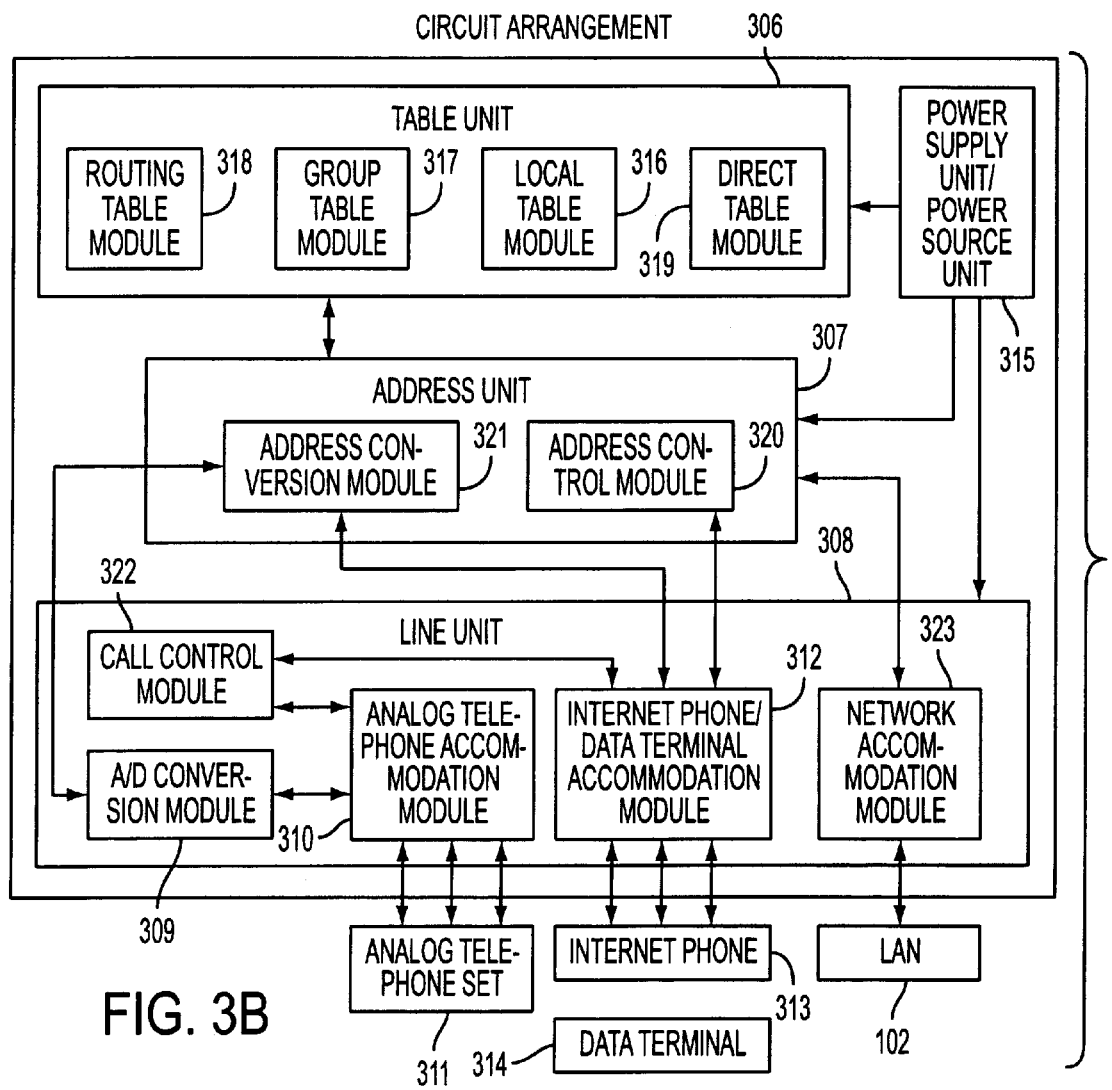

FIG. 3A is a block diagram showing the function arrangement of the preferred embodiment of the LAN telephone switching apparatuses 101 depicted in FIG. 1, while FIG. 3B is a block diagram showing the circuit arrangement thereof.

A memory function 302 in FIG. 3A is implemented by a table unit 306 in FIG. 3B.

A CPU function 303 in FIG. 3A is implemented by an address unit 307 in FIG. 3B.

An A/D (analog/digital) conversion function 304 in FIG. 3A is implemented by an A/D conversion module 309 included in a line unit 308 as shown in FIG. 3B.

A line function 305 in FIG. 3A is implemented by an analog telephone accommodation module 310 serving to accommodate analog telephone sets 311 therein and included in the line unit 308 as shown in FIG. 3B, or by an internet phone/data terminal accommodation module 312 serving to accommodate internet phone sets or devices 313 or data terminals 314 therein and included in the line unit 308 as shown in FIG. 3B.

A power source function 301 in FIG. 3A is implemented by a power supply unit/power source unit 315 in FIG. 3B.

A local table which is held in a local table module 316 included in the table unit 306 as shown in FIG. 3B, is a number table which serves to manage the telephone numbers of the analog telephone sets 311 or internet phone devices 313 connected to the master and nodes (refer to FIG. 2), and which has a data construction exemplified in FIG. 4. Referring to FIG. 4, the telephone numbers are numbers (for example, extension numbers) which are given to the respective analog telephone sets 311 or internet phone devices 313 accommodated in the LAN telephone switching apparatus 101 holding the local table therein. Local IP addresses ("LIP" indicated in FIG. 1) or private IP addresses are LAN (102) addresses (IP addresses) which are given locally to the respective analog telephone sets 311 or internet phone devices 313, respectively, accommodated in the LAN telephone switching apparatus 101 in the LAN telephone switching apparatus 101 holding the local table therein. A common global IP address is a LAN address (IP address) which is given to the LAN telephone switching apparatus 101 holding the local table therein, so as to be unique on the LAN 102 shown in FIG. 1. TCP/UDP (transport control protocol/user datagram protocol) port numbers are port numbers to be given to TCP/UDP packets for storing therein speech signals communicated by the respective internet phone devices 313, for the purpose of executing the address conversions between the local IP addresses and the single global IP address. By way of example, the extension numbers being the telephone numbers which are allotted to the respective analog telephone sets 311 or internet phone devices 313 can be used for the port numbers as they are.

A group table which is held in a group table module 317 included in the table unit 306 as shown in FIG. 3B, is a number table which is utilized in the communication between the nodes within one group and which serves to manage the representative telephone numbers of the respective nodes within the particular group. The group table has a data construction exemplified in FIG. 5. Referring to FIG. 5, telephone numbers are the representative telephone numbers of the respective nodes (LAN telephone switching apparatuses 101) within the group. Global IP addresses are LAN addresses (IP addresses) which are given to the respective nodes within the group so as to be unique on the LAN 102 shown in FIG. 1.

A routing table which is held in a routing table module 318 included in the table unit 306 as shown in FIG. 3B, is a number table which is utilized in the communication between the nodes respectively belonging to different groups and which serves to manage the representative telephone numbers of the respective masters of the individual groups. The routing table has a data construction exemplified in FIG. 6. Referring to FIG. 6, telephone numbers are the representative telephone numbers of the respective groups. Global IP addresses are LAN addresses (IP addresses) which are given to the masters (LAN telephone switching apparatuses 101) of the respective groups so as to be unique on the LAN 102 shown in FIG. 1.

A direct table which is held in a direct table module 319 included in the table unit 306 as shown in FIG. 3B, is a number table which is utilized in the communication between the nodes respectively belonging to different groups. The direct table serves to manage the representative telephone numbers of those nodes of the other groups to which communications have ever been made, in order to quicken searches for the telephone numbers in subsequent communications. This direct table has a data construction exemplified in FIG. 7. Referring to FIG. 7, telephone numbers are the representative telephone numbers of those respective nodes (LAN telephone switching apparatuses 101) in the other groups to which communications have ever been made. Global IP addresses are LAN addresses (IP addresses) which are given to such respective nodes so as to be unique on the LAN 102 shown in FIG. 1.

An address control module 320, which is included in the address unit 307 as shown in FIG. 3B, gives local IP addresses as well as telephone numbers to the internet phone devices or sets 313 which are accommodated in the LAN telephone switching apparatus 101 including this address control module 320, and it brings the TCP/UDP port numbers into correspondence with the given telephone numbers fixedly (for example, at the same values). Also, the address control module 320 gives the local IP addresses as well as the telephone numbers to the packet communication ports of the A/D conversion module 309 corresponding to the analog telephone sets 311 which are accommodated in the above LAN telephone switching apparatus 101, and it brings the TCP/UDP port numbers into correspondence with the given telephone numbers fixedly. Then, the address control module 320 reflects the obtained results in the local table module 316.

An address conversion module 321 shown in FIG. 3B executes the address conversions between the telephone numbers corresponding to the respective analog telephone sets 311 which are accommodated in the LAN telephone switching apparatus 101 including this address conversion module 321, and the local IP addresses contained in packets which the A/D conversion module 309 communicates in correspondence with the analog telephone sets 311. Also, the address conversion module 321 executes the conversion between the sets or combinations of the local IP addresses and the telephone numbers (or TCP/UDP port numbers)

contained in packets corresponding to the respective internet phone devices 313 and analog telephone sets 311 which are accommodated in the LAN telephone switching apparatus 101 including this address conversion module 321, and the sets or combinations of the global IP addresses and the TCP/UDP port numbers (or telephone numbers) contained in the packets in the case where these packets are communicated from the LAN telephone switching apparatus 101 to the side of the LAN 102.

A call control module 322 included in the line unit 308 as shown in FIG. 3B controls calls concerning the respective analog telephone sets 311 and internet phone devices 313 which are accommodated in the LAN telephone switching apparatus 101 including this call control module 322.

The power supply unit/power source unit 315 shown in FIG. 3B feeds electric power to the table unit 306, address unit 307 and line unit 308.

A network accommodation module 323 included in the line unit 308 accommodates the LAN 102 shown in FIG. 1.

In a case where, in the above construction of the preferred embodiment, an internet phone device 313 (FIG. 3B) has been connected to the LAN telephone switching apparatus 101 constituting the LAN telephone switching system shown in FIG. 1, the internet phone/data terminal accommodation module 312 accommodating this internet phone device 313 therein implements an internet phone connection function, and the address unit 307 automatically gives this internet phone device 313 the telephone number and the set of the local IP address and TCP/UDP port number As a result, the internet phone device 313 is permitted to join in the LAN telephone network, and speech over the internet phone device 313 is actualized in the LAN telephone network.

In a case where a data terminal 314 (FIG. 3B) has been connected to the LAN telephone switching apparatus 101 constituting the LAN telephone switching system, the internet phone/data terminal accommodation module 312 accommodating this data terminal 314 therein implements a data terminal connection function, and the address unit 307 automatically gives the data terminal 314 the set of the local IP address and TCP/UDP port number. As a result, the data terminal 314 is permitted to join in the LAN 102 (FIG. 1), and data communication over the data terminal 314 is actualized in the LAN 102.

In a case where the analog telephone set 311 (FIG. 3B) has been connected to the LAN telephone switching apparatus 101 constituting the LAN telephone switching system, the power supply unit/power source unit 315 feeds electric power to this analog telephone set 311, the call control module 322 included in the line unit 308 accepts a call from this analog telephone set 311, and the A/D conversion module 309 included in the line unit 308 executes the analog-to-digital/digital-to-analog conversions of speech signals concerning this analog telephone set 311 and packet disassembling/assembling processes for digital speech signals concerning the same. In this way the analog telephone set 311 is permitted to join in the LAN telephone network, and speech over the analog telephone set 311 is actualized in the LAN telephone network.

Details of Communication Procedures in LAN Telephone Switching System

Next, the details of procedures with which the analog telephone set 311 or internet phone device 313 included in the LAN telephone switching system establishes communication (speech) will be described.

In case of the communication between the telephone sets (analog telephone sets 311 or internet phone devices 313), the node being the LAN telephone switching apparatus 101 mutually translates telephone numbers (or TCP/UDP port numbers) as well as local IP addresses which are set for the telephone sets, and global IP addresses as well as TCP/UDP port numbers (or telephone numbers) which enables execution of communication transfer in the LAN 102. Thus, the pertinent communication is actualized.

Since a plurality of analog telephone sets 311 or internet phone devices 313 can be accommodated in the LAN telephone switching apparatus 101, the global IP address which is possessed by one LAN telephone switching apparatus 101 and the plurality of local IP addresses need to be exactly mapped to each other. Therefore, the telephone number which is set for each analog telephone set 311 or internet phone device 313, or the TCP/UDP port number which corresponds to the telephone number fixedly, is combined with the local IP address which is set for each, and the combination and the global IP address are converted from one to the other. In this way, the telephone sets at both ends which are used for communication can be specified.

Figure 8:
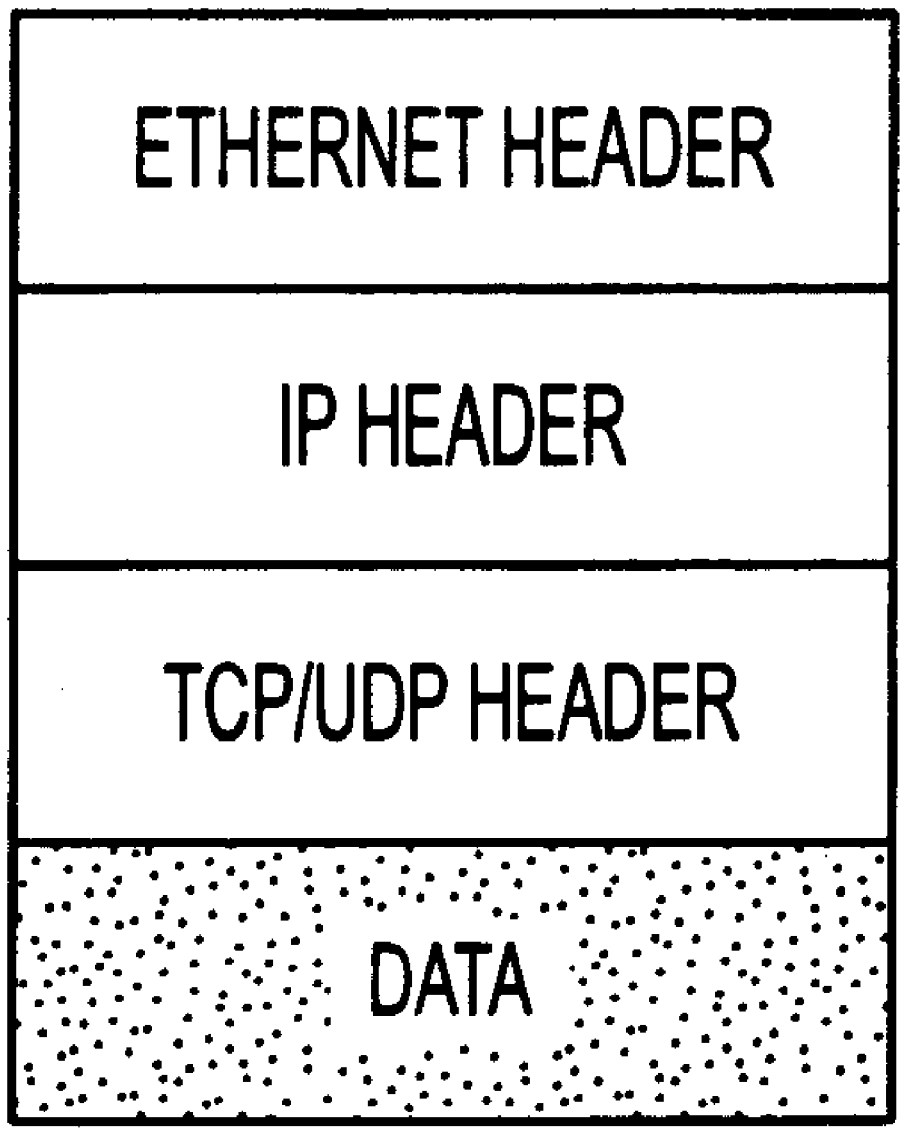
FIG. 8 is a diagram showing the data construction of a packet for use in communication.

FIG. 8 is a diagram showing the data construction of a packet for use in communication. The head part of the packet bears an Ethernet header for identifying this packet as an Ethernet frame on the single segment of the LAN 102, an IP header for delivering this packet on the LAN 102 with the router 103 (FIG. 1) included, and a TCP (transport control protocol)/UDP (user datagram protocol) header for realizing the high-reliability communication of a retransmission control, etc. Further, a data field of a variable length (in which speech data is stored in the case of the telephonic communication) is attached to them successively.

Figure 9A:
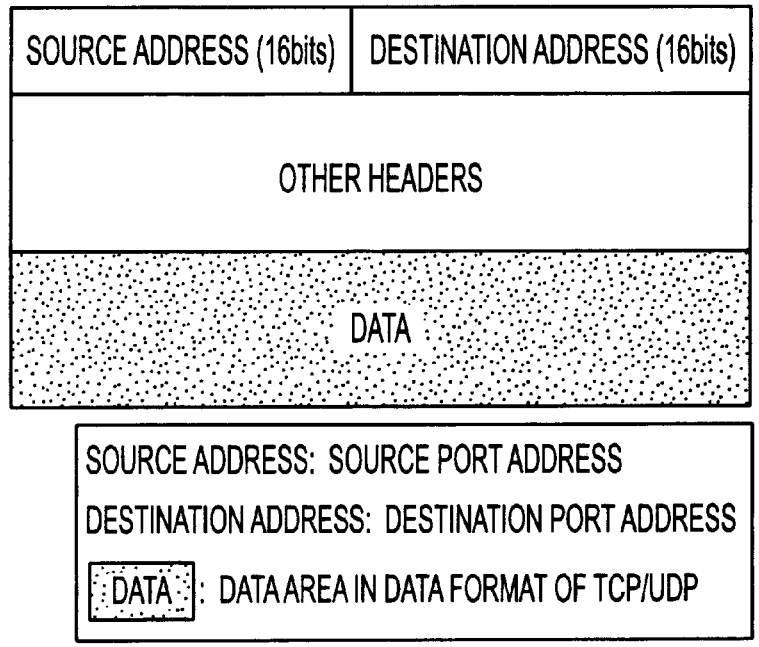
FIGS. 9A and 9B are diagrams each showing a TCP/UDP (transport control protocol/user datagram protocol) header format.

Here, as shown in FIG. 9A by way of example, the telephone number of the telephone set as a source or an originating party and that of the telephone set as a destination or a terminating party can be communicated in the state in which the telephone numbers are stored as respective TCP/UDP port numbers in a source port address field and a destination port address field included within the TCP/UDP header shown in FIG. 8.

Figure 9B:
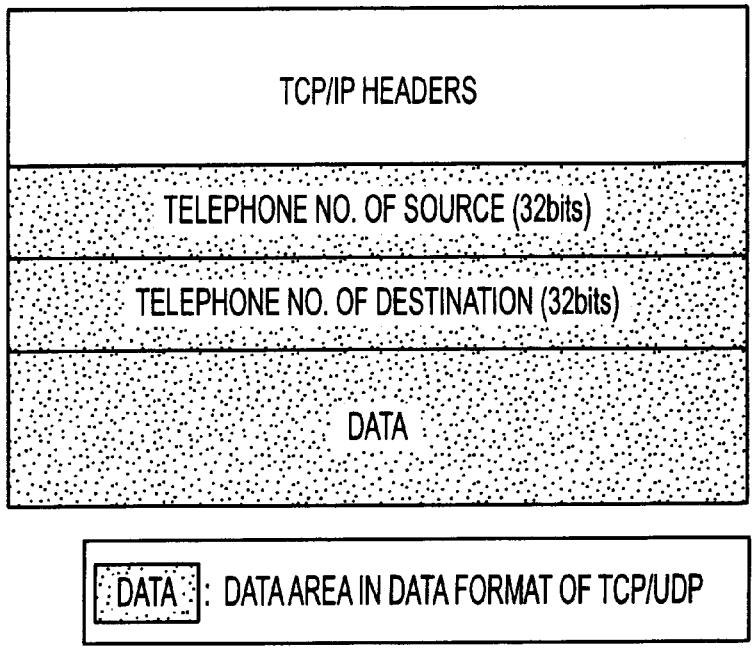

Alternatively, as shown in FIG. 9B by way of example, the telephone number of the telephone set as a source and that of the telephone set as a destination can be communicated in the state in which the telephone numbers are stored in the data field shown in FIG. 8, outside the TCP/UDP header shown in FIG. 8.

Figure 10:
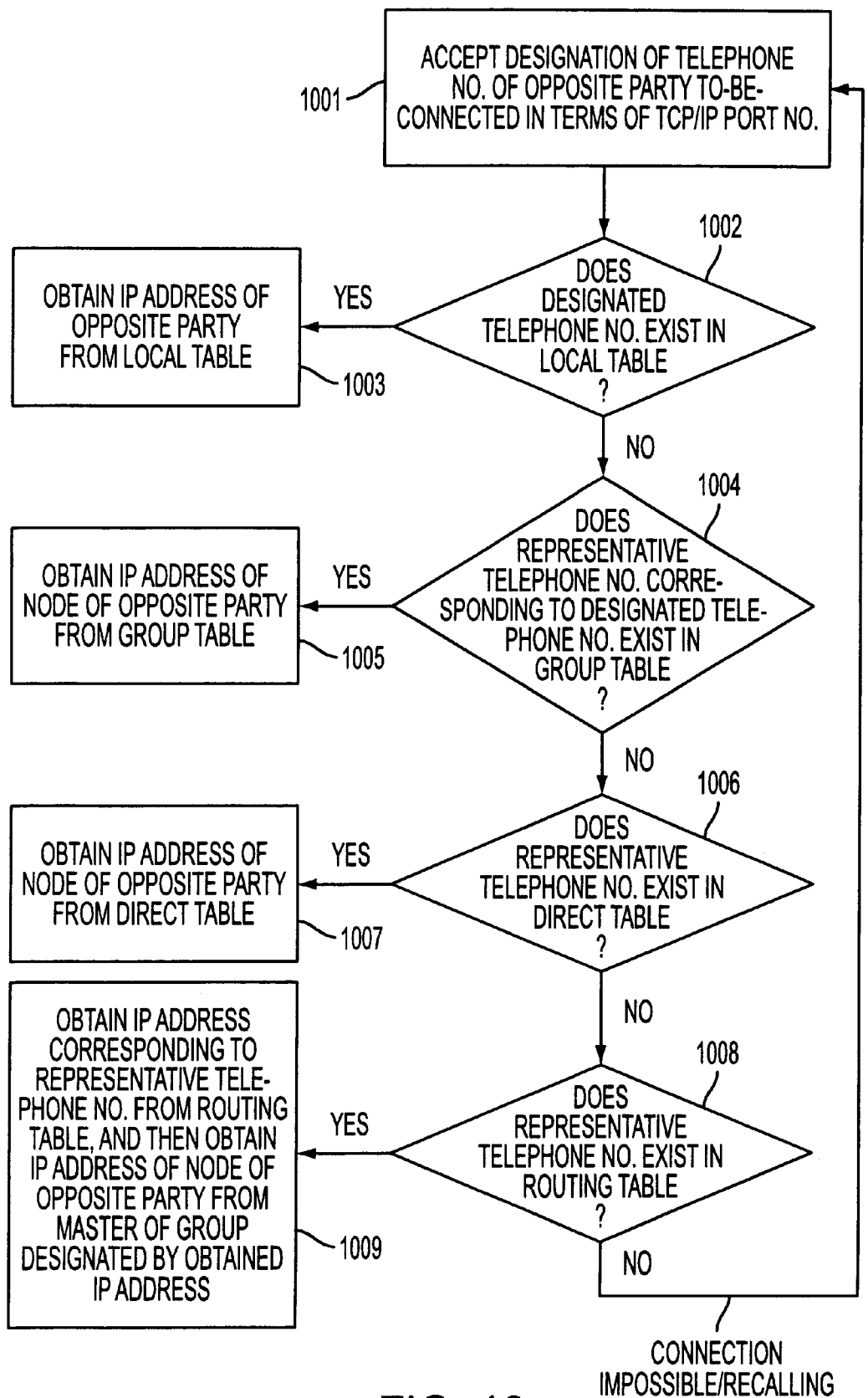
FIG. 10 is an operating flowchart showing a call control.

FIG. 10 is an operating flowchart showing a call control process which the address control module 320 (FIG. 3B) included in the LAN telephone switching apparatus 101 performs in the case where the telephone numbers are communicated in terms of the TCP/UDP port numbers.

First, the address control module 320 receives a packet from the analog telephone set 311 or internet phone device 313, via the internet phone/data terminal accommodation module 312 or A/D conversion module 309 which are included in the line unit 308. Thus, the module 320 accepts the designation of the telephone number of the opposite party to-be-connected (telephone number of the destination) as the destination port address (FIG. 9A) of the packet (step 1001).

The address control module 320 decides whether or not the destination telephone number exists in the local table (refer to FIG. 4) retained in the local table module 316 (step 1002).

If the destination telephone number exists in the local table, the address control module 320 acquires the local IP address corresponding to the destination telephone number from the local table (step 1002 to step 1003).

On the other hand, if the destination telephone number does not exist in the local table, the address control module 320 decides whether or not a representative telephone number corresponding to the destination telephone number exists in the group table (refer to FIG. 5) retained in the group table module 317 (step 1004).

If the representative telephone number exists in the group table, the address control module 320 acquires from the group table the global IP address of the node (LAN telephone switching apparatus 101) in which the telephone set corresponding to the representative telephone number is accommodated (step 1004 to step 1005).

On the other hand, if the representative telephone number does not exist in the group table, the address control module 320 decides whether or not the representative telephone number exists in the direct table (refer to FIG. 7) retained in the direct table module 319 (step 1006).

If the representative telephone number exists in the direct table, the address control module 320 acquires from the direct table the global IP address of the node in which the telephone set corresponding to the representative telephone number is accommodated (step 1006 to step 1007).

On the other hand, if the representative telephone number does not exist in the direct table, the address control module 320 decides whether or not the representative telephone number exists in the routing table (refer to FIG. 6) retained in the routing table module 318 (step 1008).

If the representative telephone number exists in the routing table, the address control module 320 obtains the global IP address corresponding to the representative telephone number from the routing table, and it acquires the global IP address of the node in which the telephone set corresponding to the representative telephone number is accommodated, from the master of a group designated by the obtained global IP address (step 1008 to step 1009).

On the other hand, if the representative telephone number does not exist in the routing table, the address control module 320 regards the connection as being impossible and performs a re-calling control (step 1008 to step 1001).

In the above way, the address control module 320 included in the node (LAN telephone switching apparatus 101) of the source can acquire the destination telephone number from the transmission packet and can acquire the global IP address of the node of the destination from the table unit 306 or the master of the different group. As a result, a path from the node of the source to that of the destination is established. In the node of the destination having received the packet, the telephone set of the destination is specified by referring to the local table.

Figure 11A:
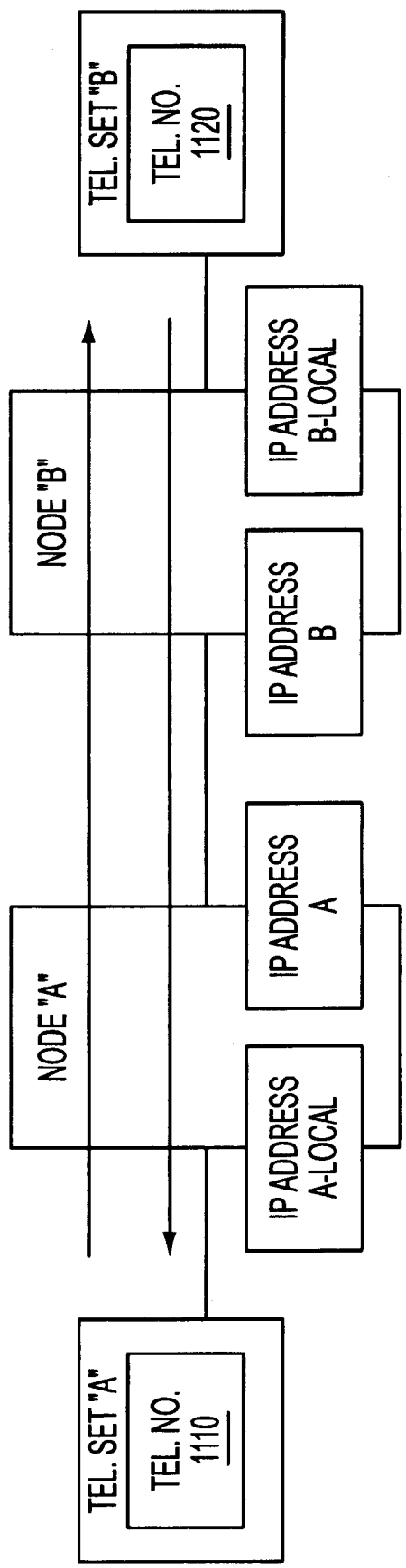

FIGS. 11A, 11B and 11C are diagrams for explaining the transitions of the information contents of IP addresses and port numbers during communication.

First, it is assumed as shown in FIG. 11A that a telephone set "A" (analog telephone set 311 or internet phone device 313) is accommodated in a node "A", that the telephone set "A" has a telephone number "1110" and a local IP address "A-Local", and that the node "A" has a global IP address "A". It is also assumed that a telephone set "B" (analog telephone set 311 or internet phone device 313) is accommodated in a node "B", that the telephone set "B" has a telephone number "1120" and a local IP address "B-Local", and that the node "B" has a global IP address "B".

In this case, the transitions of the contents of the information items in the case of communication from the telephone set "A" to the telephone set "B" become as shown in FIG. 11B (in the direction of an arrow indicated in FIG. 11B).

First, a packet which has been transmitted from the telephone set "A" and which is not yet subjected to address conversion by the address conversion module 321 (FIG. 3B) of the node "A", bears the local IP address "A-Local" of the telephone set "A" and the telephone number "1110" thereof as the source information. As stated before, the telephone number "1110" is set in the source port address field (FIG. 9A, or Port number **\*\*\*\* of the source in FIG. 11B), or in the data field (FIG. 9B**) of the packet.

In addition, the packet bears the global IP address "A" of the node "A" accommodating the telephone set "A" therein, and the telephone number "1120" of the telephone set "B", as the destination information. As stated before, the telephone number "1120" is also set in the destination port address field (FIG. 9A, or Port number **\*\*\*\* of the destination in FIG. 11B), or in the data field (FIG. 9B**) of the packet.

Subsequently, the packet which has been subjected to the address conversion by the address conversion module 321 of the node "A" and which is not yet subjected to address conversion again by the address conversion module 321 of the node "B" bears the global IP address "A" of the node "A" accommodating the telephone set "A" therein, and the telephone number "1110" of the telephone set "A", as the source information. Likewise to the foregoing, as stated before, the telephone number "1110" is set in the source port address field (FIG. 9A, or Port number **\*\*\*\* of the source in FIG. 11B), or in the data field (FIG. 9B**) of the packet.

In addition, the packet bears the global IP address "B" of the node "B" accommodating the telephone set "B" therein, and the telephone number "1120" of the telephone set "B", as the destination information. Likewise to the foregoing, as stated before, the telephone number "1120" is set in the destination port address field (FIG. 9A, or Port number **\*\*\*\* of the destination in FIG. 11B), or in the data field (FIG. 9B) of the packet. The global IP address "B" of the node "B" is extracted by the control of the operating flowchart shown in FIG. 10**.

Lastly, after the packet has again been subjected to the address conversion by the address conversion module 321 of the node "B", the packet which advances toward the telephone set "B" bears the global IP address "A" of the node "A" accommodating the telephone set "A" therein, and the telephone number "1110" of the telephone set "A", as the source information. Likewise to the foregoing, as stated before, the telephone number "1110" is set in the source port address field (FIG. 9A, or Port number **\*\*\*\* of the source in FIG. 11B), or in the data field (FIG. 9B**) of the packet.

In addition, the packet bears the local IP address "B-Local" of the telephone set "B" and the telephone number "1120" thereof as the destination information. The local IP address "B-Local" is obtained from the local table retained in the node "B", with which the telephone set "B" is specified, so that the speech signal contained in the packet arrives at the telephone set "B".

Contrary to the above, the transitions of the contents of the information in the case of communication from the telephone set "B" to the telephone set "A" become as shown in FIG. 11C (in the direction of an arrow indicated in FIG. 11C). The transitions are the same as in the above case of FIG. 11B, with the simple difference that the roles of the telephone sets "A" and "B" are reversed.

In the way thus far described, according to the preferred embodiment, any of the analog telephone sets 311 or internet phone devices 313 which are accommodated in any of the nodes (LAN telephone switching apparatuses 101) belonging to the LAN telephone switching system, can freely communicate with any of the analog telephone sets 311 and internet phone devices 313 which are accommodated in the same node, or in another node within the same group, or a different group, by the use of extension numbers which are unique in the system.

Moreover, the analog telephone sets 311 or internet phone devices 313 are respectively endowed with the local IP addresses (or private IP addresses) being the IP addresses which are unique in the node (LAN telephone switching apparatuses 101) accommodating the sets 311 or devices 313 therein. When a packet corresponding to any of the sets 311 or devices 313 is to be communicated on the LAN 102 outside the particular node, the set of the local IP address and telephone number (or TCP/UDP port number) are converted to the global IP address, and vice versa, for the communication. Therefore, the problem of the exhaustion of the number of IP addresses can be solved.

Here, in a case where the data terminal 314 (FIG. 3B) executes communication, as stated before, the set of a local IP address and a TCP/UDP port number is automatically given to the data terminal 314, and the set and the global IP address are likewise converted from one to the other by the node accommodating the data terminal 314 therein. Thus, the communication between the data terminal 314 and another data terminal 314 accommodated in any other node is actualized.

In this case, the TCP/UDP port number to be used for the data terminal 314 is any number which forms no hindrance to the communication of the analog telephone set 311 or the internet phone device 313, for example, any of [WELL KNOWN PORT NUMBERS] stipulated in "RFC (Request For Comment) 1700" being protocol rules on the Internet which are partly shown in FIG. 12 and so forth, can be used.

Process for Adding Node

Figure 13:
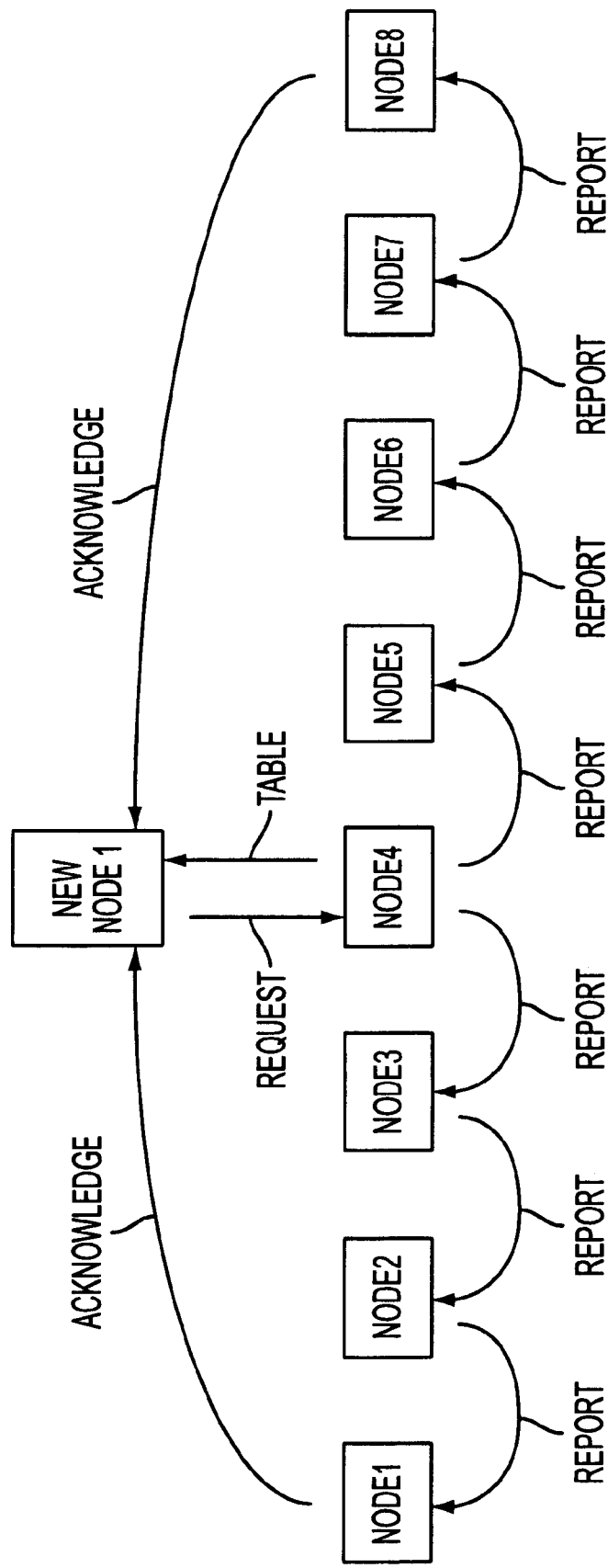
FIG. 13 is a diagram for explaining a process for adding a node.
Figure 14:
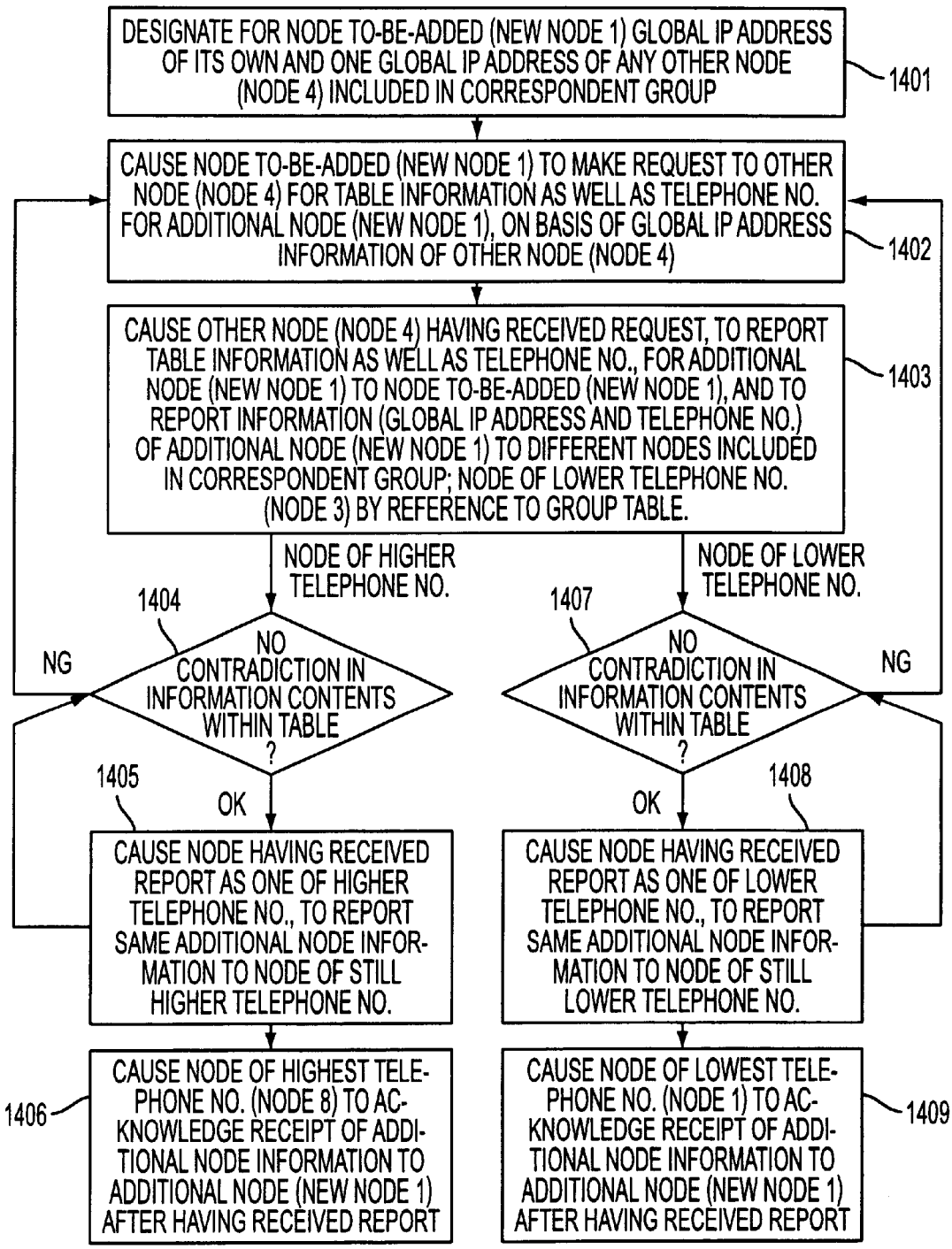
FIG. 14 is an operating flowchart showing the process for adding the node.

FIG. 13 is a diagram for explaining a case where a node is added to a LAN telephone switching system, while FIG. 14 is an operating flowchart showing the process in this case. The process shown in the operating flowchart is executed by the address unit 307 (FIG. 3B) of each node.

First, the node to be added (New Node 1) designates its global IP address and the global IP address of another node (for example, Node 4) included in the group into which the new node is to be added (step 1401).

Subsequently, the node to be added (New Node 1) makes a request to the other node (Node 4) for table information and a telephone number for this node to be added (New Node 1), according to the global IP address information of the other node (Node 4) (step 1402).

The other node (Node 4) having accepted the request, reports the table information and the telephone number for the node to be added (New Node 1), to the node to be added (New Node 1), and reports the information (global IP address and telephone number) of the node to be added (New Node 1) to other nodes within the group in which other node (Node 4) is included. In this case, the other node (Node 4) reports the above additional node information to the adjacent node (Node 5) with a telephone number higher than its telephone number and to the adjacent node (Node 3) with a telephone number lower than its telephone number, by referring to the group table (FIG. 5) retained in the group table module 317 (step 1403).

The node (Node 5) adjacent to the other node (Node 4), which possesses a higher telephone number and which has received the report of the additional node information, reflects the additional node information in the group table, and it decides whether or not any contradiction exists in the contents of the table (step 1404).

In case of the presence of any contradiction in the contents, the processing of the steps 1402 and 1403 is iteratively executed (step 1404 to step 1402).

In case of the absence of any contradiction in the contents, the node which has received the report of the additional node information in the above mentioned step 1403 as the node of the higher telephone number, reports the same additional node information to the adjacent node with a still higher telephone number (step 1405). Each node having received the report reflects the additional node information in the group table, and it decides whether or not any contradiction exists in the contents of the table (iteration of step 1405 to step 1404 to step 1405).

In this manner, the additional node information is reported in succession (in a chain-like fashion) to the nodes of successively higher telephone numbers. In due course, the node of the highest telephone number (Node 8) acknowledges the receipt of the additional node information to the node to be added (New Node 1) after the additional node information has been reported thereto (step 1406).

Meanwhile, similarly to the above, the additional node information is reported in succession (in chain-like fashion) to the nodes of successively lower telephone numbers (iteration of step 1407 to step 1408 to step 1407).

In due course, the node of the lowest telephone number (Node 1) acknowledges the receipt of the additional node information to the node to be added (New Node 1) after the additional node information has been reported thereto (step 1409).

In the above way, the addition of the new node into the group is realized.

Process for Monitoring Nodes

Figure 15:
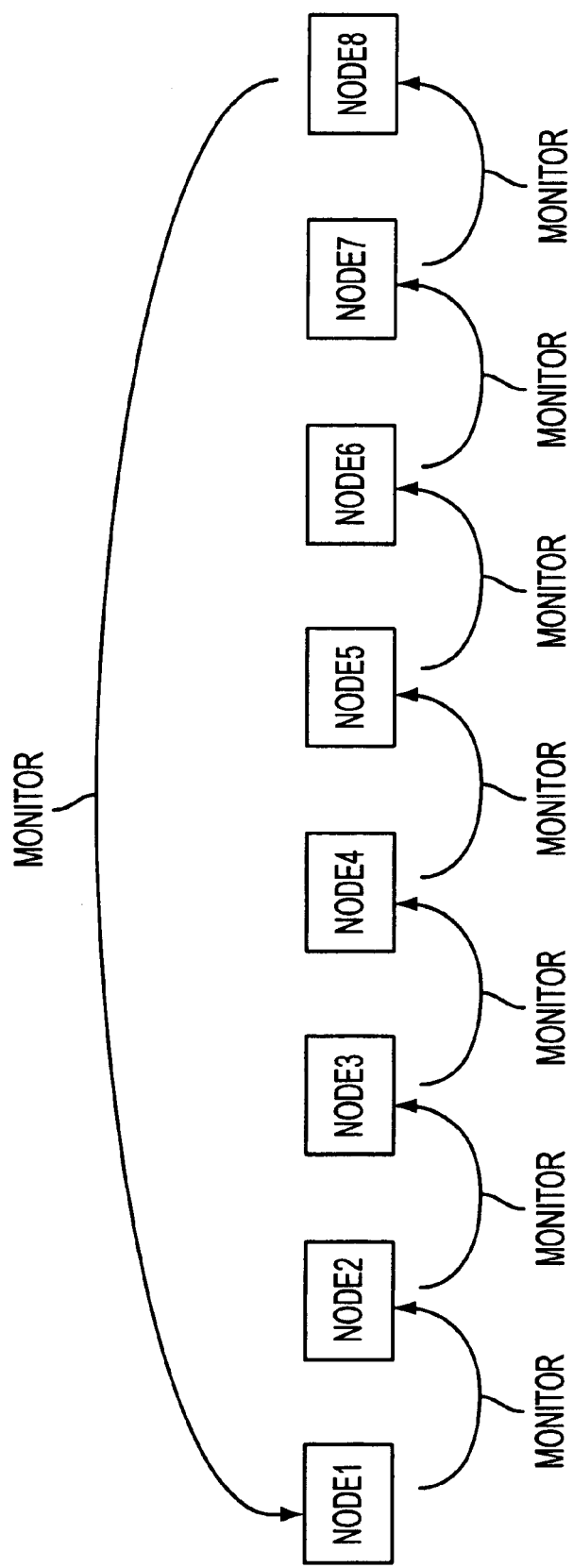
FIG. 15 is a diagram for explaining a process for observing nodes.

FIG. 15 is a diagram for explaining a process for monitoring or observing nodes in each group of a LAN telephone switching system.

As shown in FIG. 15, the address units 307 (FIG. 3B) of individual nodes cyclically observe the operating states of the other nodes among the nodes of the group.

Process for Removing Nodes

Figure 16:
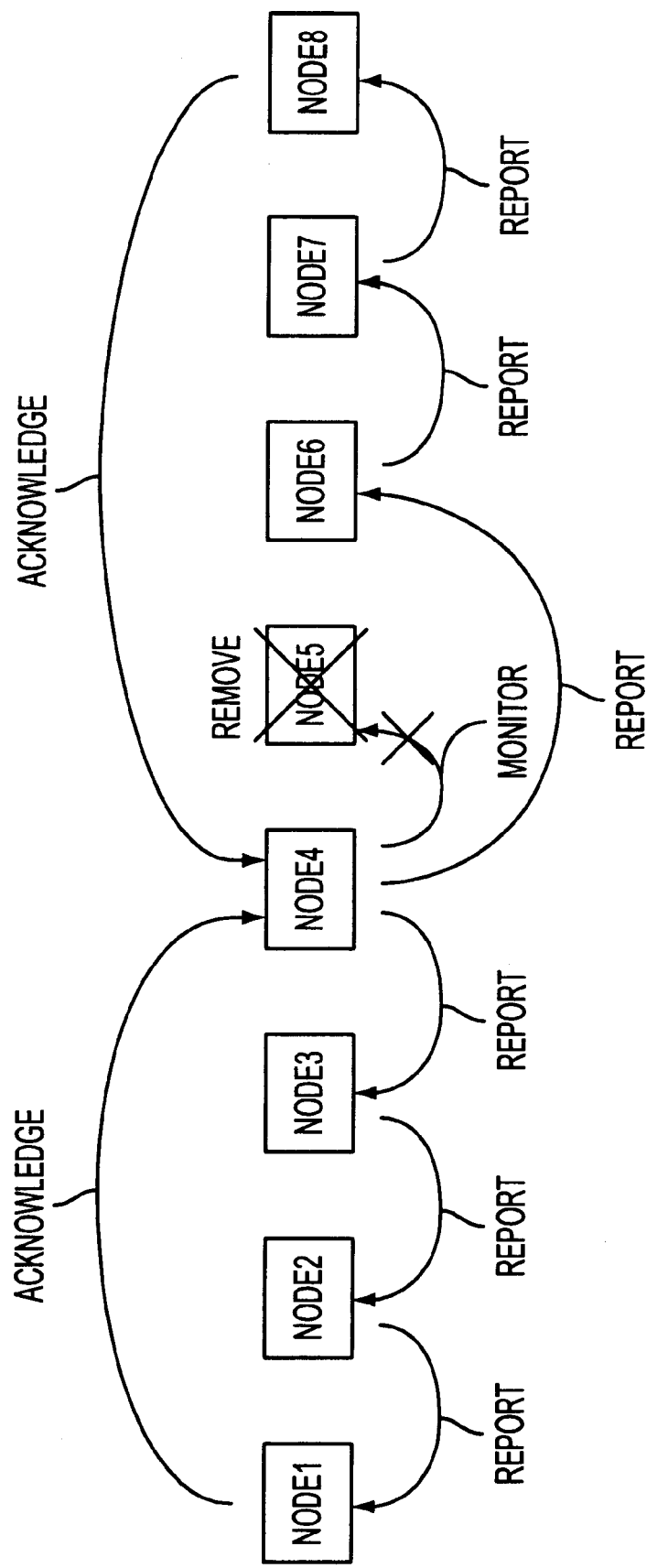
FIG. 16 is a diagram for explaining a process for deleting a node.
Figure 17:
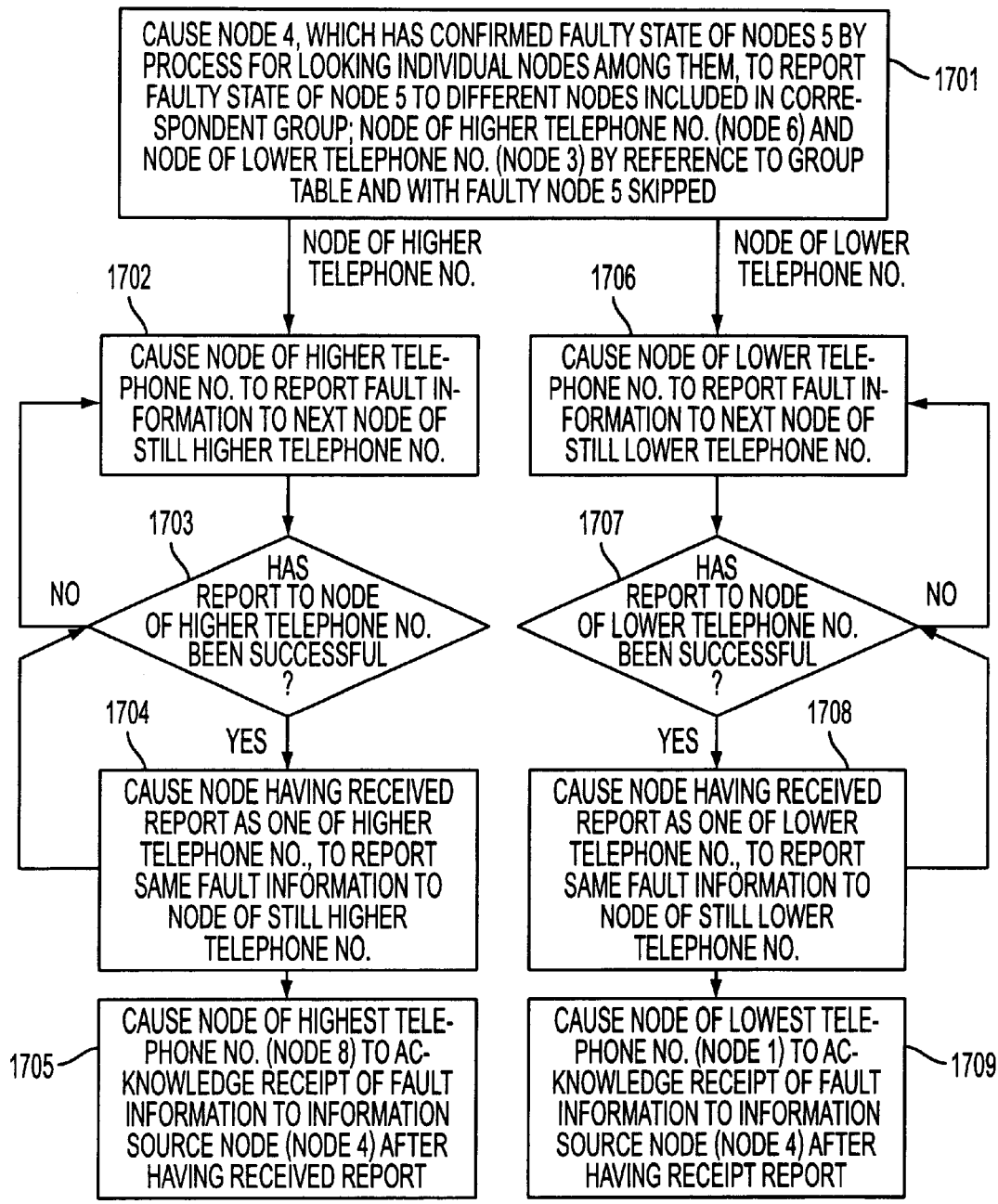
FIG. 17 is an operating flowchart showing the process for deleting the node.

FIG. 16 is a diagram for explaining a case where a node is removed or deleted from a LAN telephone switching system, while FIG. 17 is an operating flowchart showing the process in this case. The process shown in the operating flowchart is executed by the address unit 307 (FIG. 3B) of each node.

For example, in the case where the Node 4 has confirmed the faulty state of the Node 5 by the observing process among the nodes, it reports the faulty state of the Node 5 to the other nodes within the group in which it is included. In this case, the Node 4 reports the fault information of the Node 5 to the adjacent Node 6 with a telephone number higher than its own telephone number, skipping the faulty Node 5, and to the adjacent Node 3 with a telephone number lower than its own telephone number by referring to the group table (FIG. 5) retained in the group table module 317 (step 1701).

The Node 6 with the higher telephone number, which has received the report of the fault information of the Node 5, reports the fault information of the Node 5 to the next node with a telephone number higher than its own telephone number (step 1702). Further, the Node 6 decides whether or not the report has been made successfully (step 1703).

In case the report has not been made successfully, the Node 6 reports the fault information of the Node 5 to the still next node with a telephone number higher than its own telephone number, and it decides whether or not the report has been made successfully (iteration of step 1703 to step 1702 to step 1703).

In case the report has been made successfully, the node which has received the report of the fault information of the Node 5 as the node with the higher telephone number, reports the fault information of the Node 5 to the next node with a still higher telephone number (step 1704), and it decides whether or not the report has been made successfully (step 1703 to step 1704 to step 1703).

In case the report has not been made successfully, the node in question reports the fault information of the Node 5 to the next node with a telephone number higher than its own telephone number, and it decides whether or not the report has been made successfully (iteration of step 1703 to step 1702 to step 1703).

In this manner, the fault information of the Node 5 is reported in succession (in a chain-like fashion) to the nodes with successively higher telephone numbers. In due course, the node with the highest telephone number (Node 8) acknowledges receipt of the fault information back to the Node 4 being the source of the information, after the fault information has been reported thereto (step 1705).

Meanwhile, similarly to the above, the fault information of the Node 5 is reported in succession (in a chain-like fashion) to the nodes with successively lower telephone numbers (steps 1706 to 1708).

In due course, the node with the lowest telephone number (Node 1) acknowledges the receipt of the fault information back to the Node 4 being the information source, after the fault information has been reported thereto (step 1709).

Process for Adding a Plurality of Nodes

Figure 18:
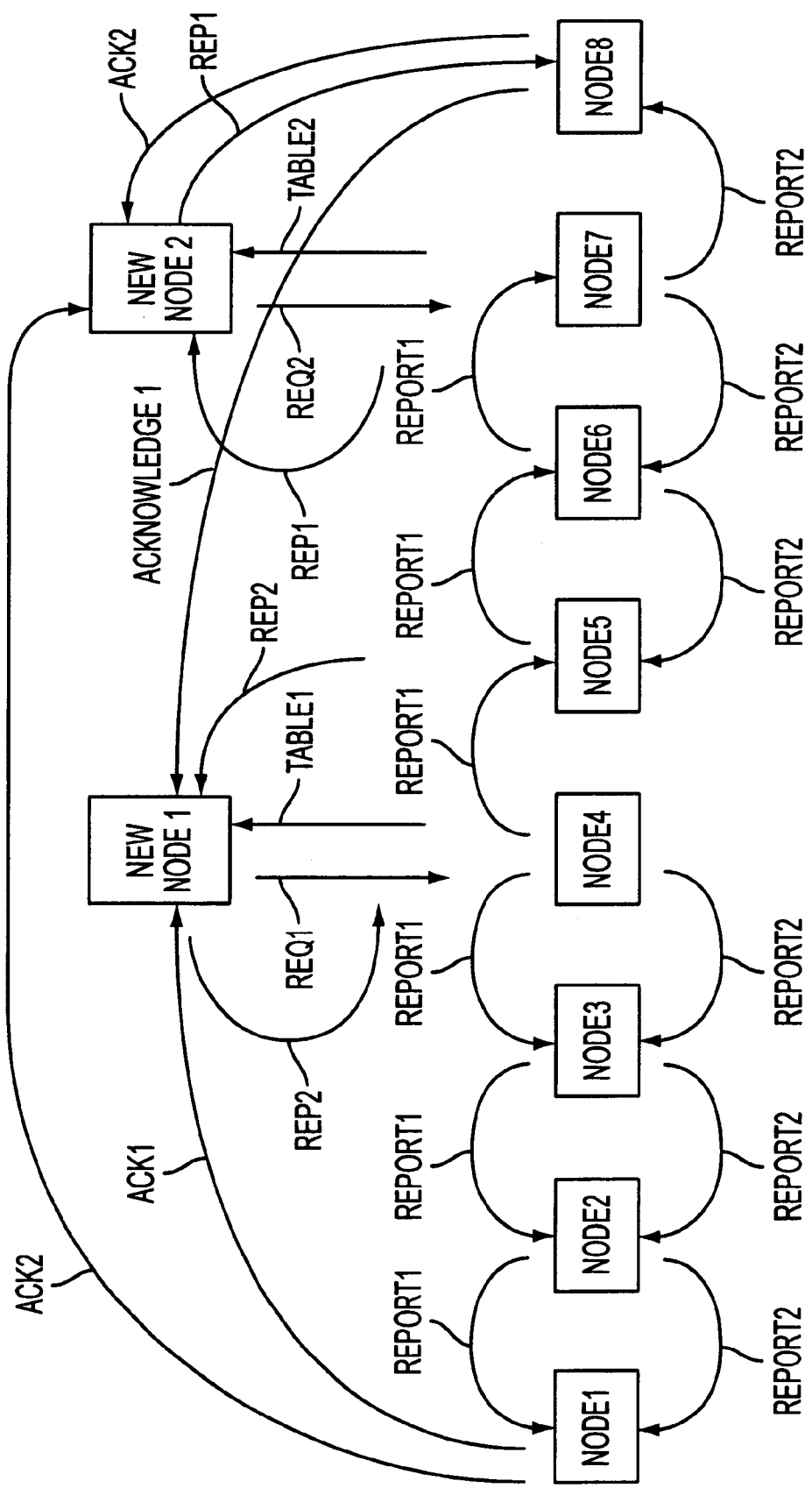
FIG. 18 is a diagram for explaining the operation of a process for adding a plurality of nodes.
Figure 19:
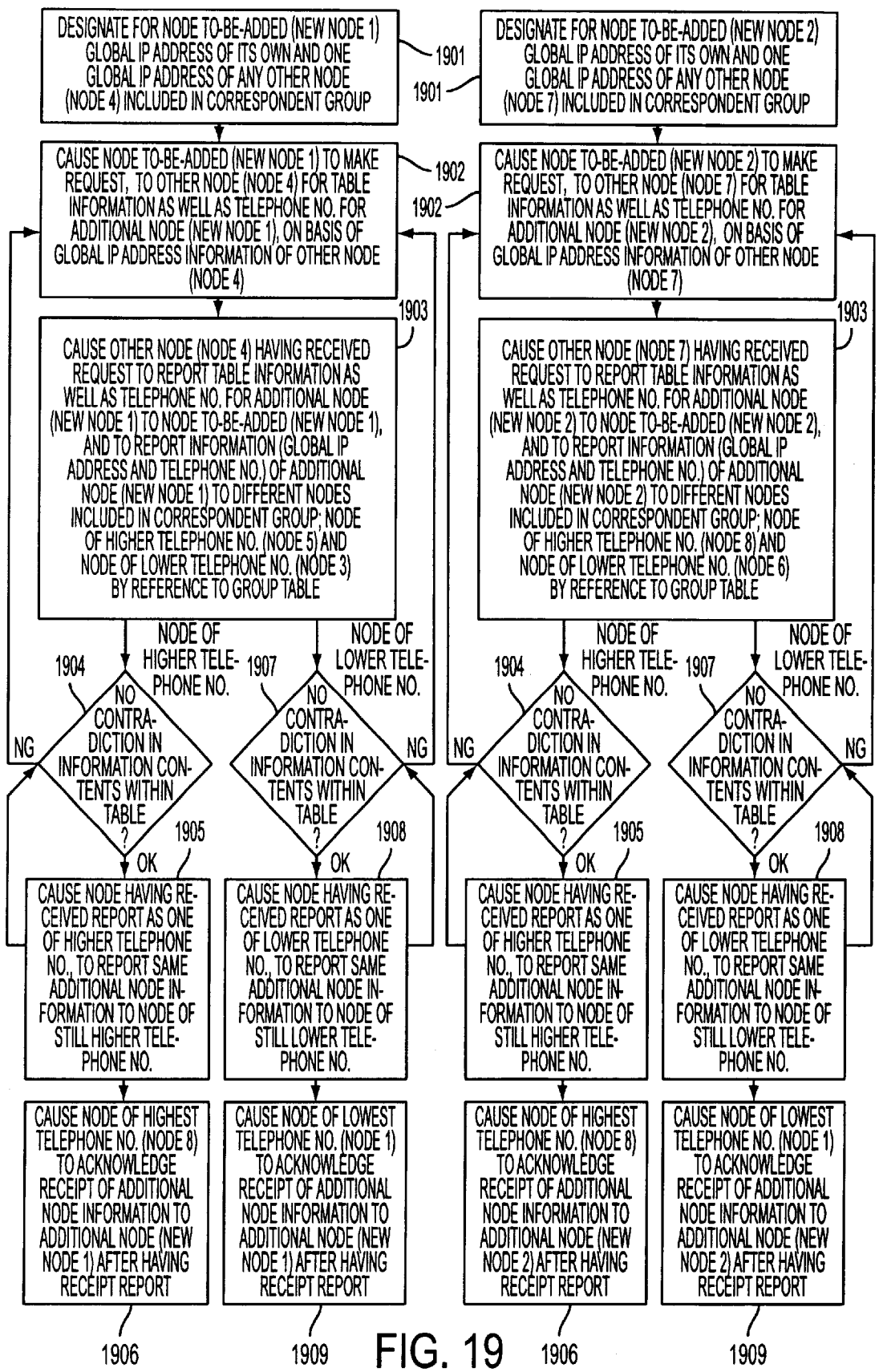
FIG. 19 is an operating flowchart showing the process for adding the nodes.

FIG. 18 is a diagram for explaining a case where a plurality of nodes are added to a LAN telephone switching system at the same time, while FIG. 19 is an operating flowchart showing the process in this case. The process shown in the operating flowchart is executed by the address unit 307 (FIG. 3B) of each node.

The process in the case where the plurality of nodes are added into a group at the same time, is basically the same as the process in the case where a single node is added, as described before in conjunction with FIGS. 13 and 14.

That is to say, the series of processes of steps 1901 to 1909 in FIG. 19, which are similar to the series of processes of the steps 1401 to 1409 in FIG. 14 as described before, are executed in parallel for the respective nodes to-be-added (two nodes to-be-added "New Node 1" and "New Node 2" in the example of FIGS. 18 and 19).

Process for Removing a Plurality of Nodes

Figure 20:
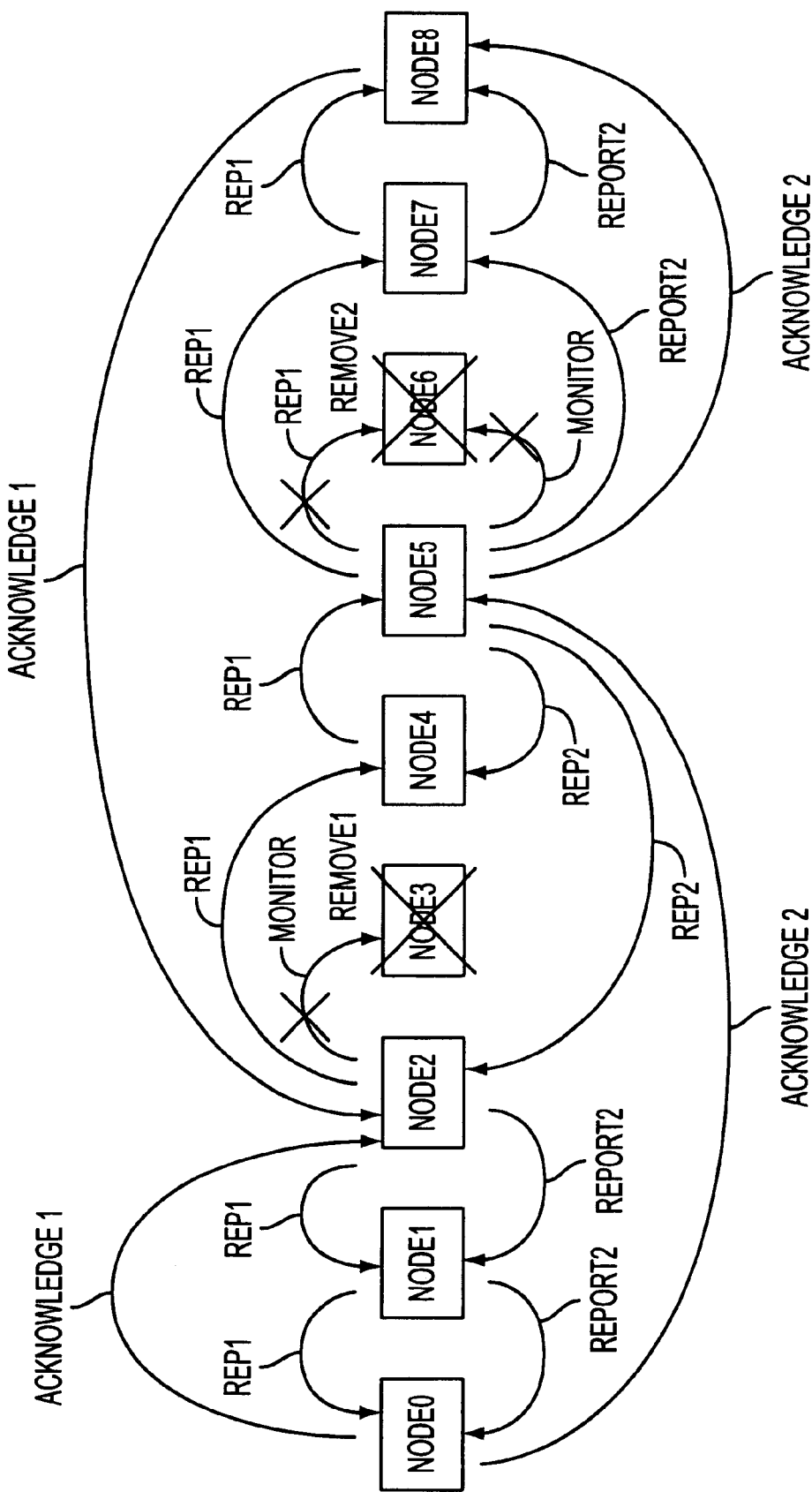
FIG. 20 is a diagram for explaining the operation of a process for deleting a plurality of nodes.
Figure 21:
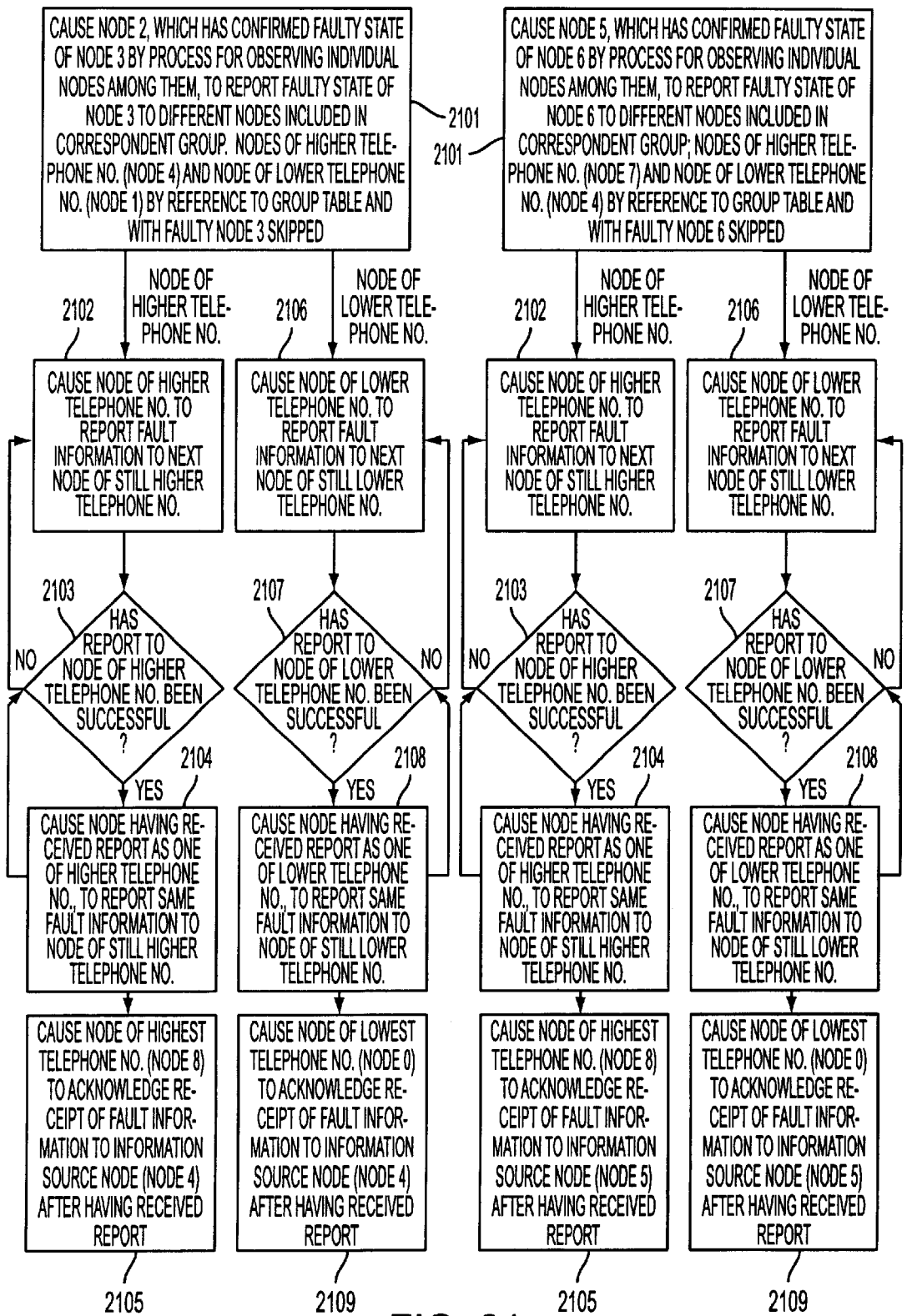
FIG. 21 is an operating flowchart showing the process for deleting the nodes.

FIG. 20 is a diagram for explaining a case where a plurality of nodes are deleted from a LAN telephone switching system at the same time, while FIG. 21 is an operating flowchart showing the process in this case. The process shown in the operating flowchart is executed by the address unit 307 (FIG. 3B) of each node.

The process in the case where the plurality of nodes are deleted from a group at the same time, is basically the same as the process in the case where a single node is deleted, as described before in conjunction with FIGS. 16 and 17.

More specifically, the series of processes of steps 2101 to 2109 in FIG. 21, which are similar to the series of processes of the steps 1701 to 1709 in FIG. 17 as described before, are executed in parallel for the respective nodes to-be-deleted (two nodes "Node 3" and "Node 6" in the example of FIGS. 20 and 21) as the fault information reporting processes.

Process for Adding/Deleting a Plurality of Nodes

Figure 22:
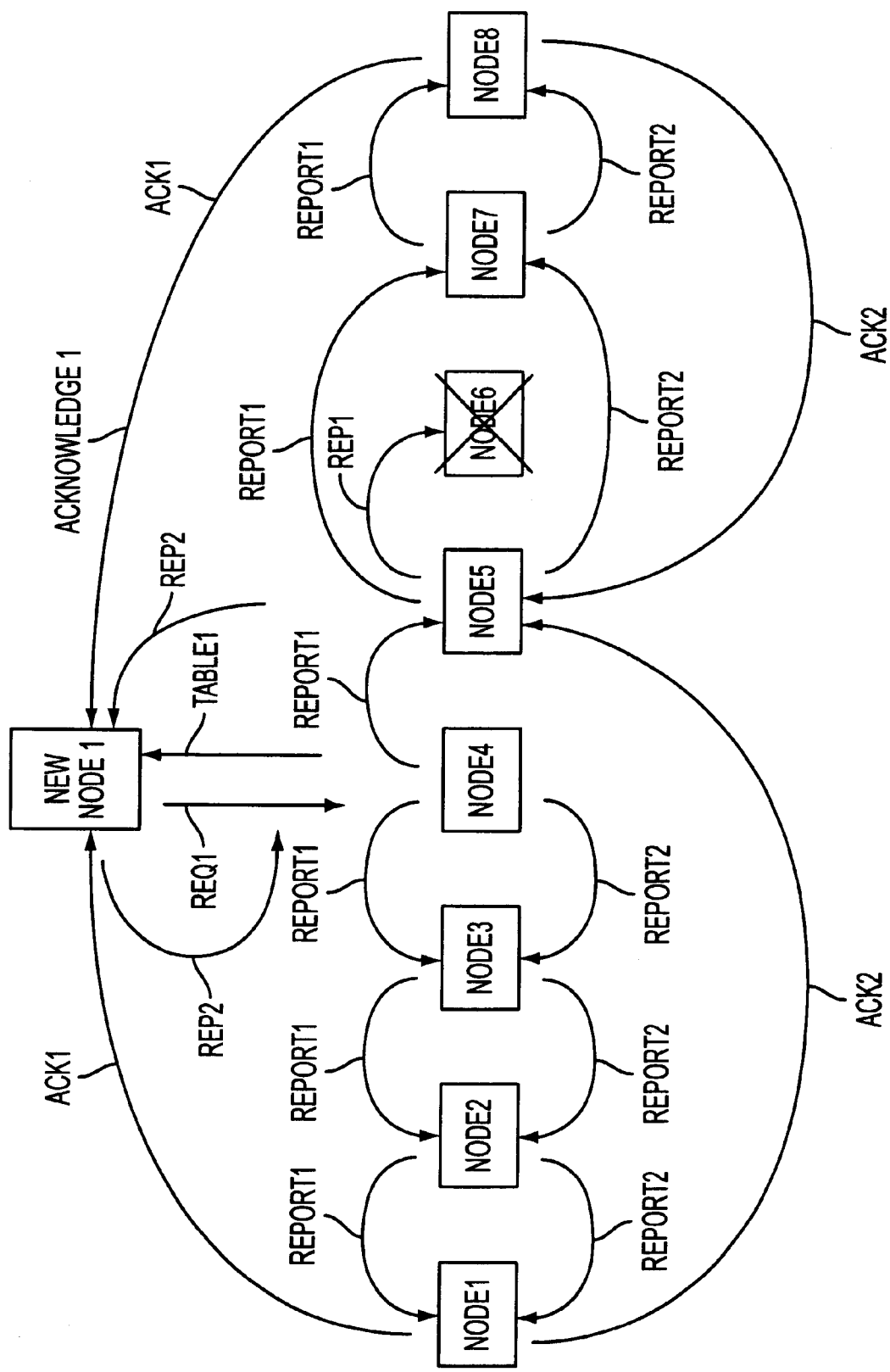
FIG. 22 is a diagram (#1) for explaining the operation of a process for adding/deleting a plurality of nodes.
Figure 23:
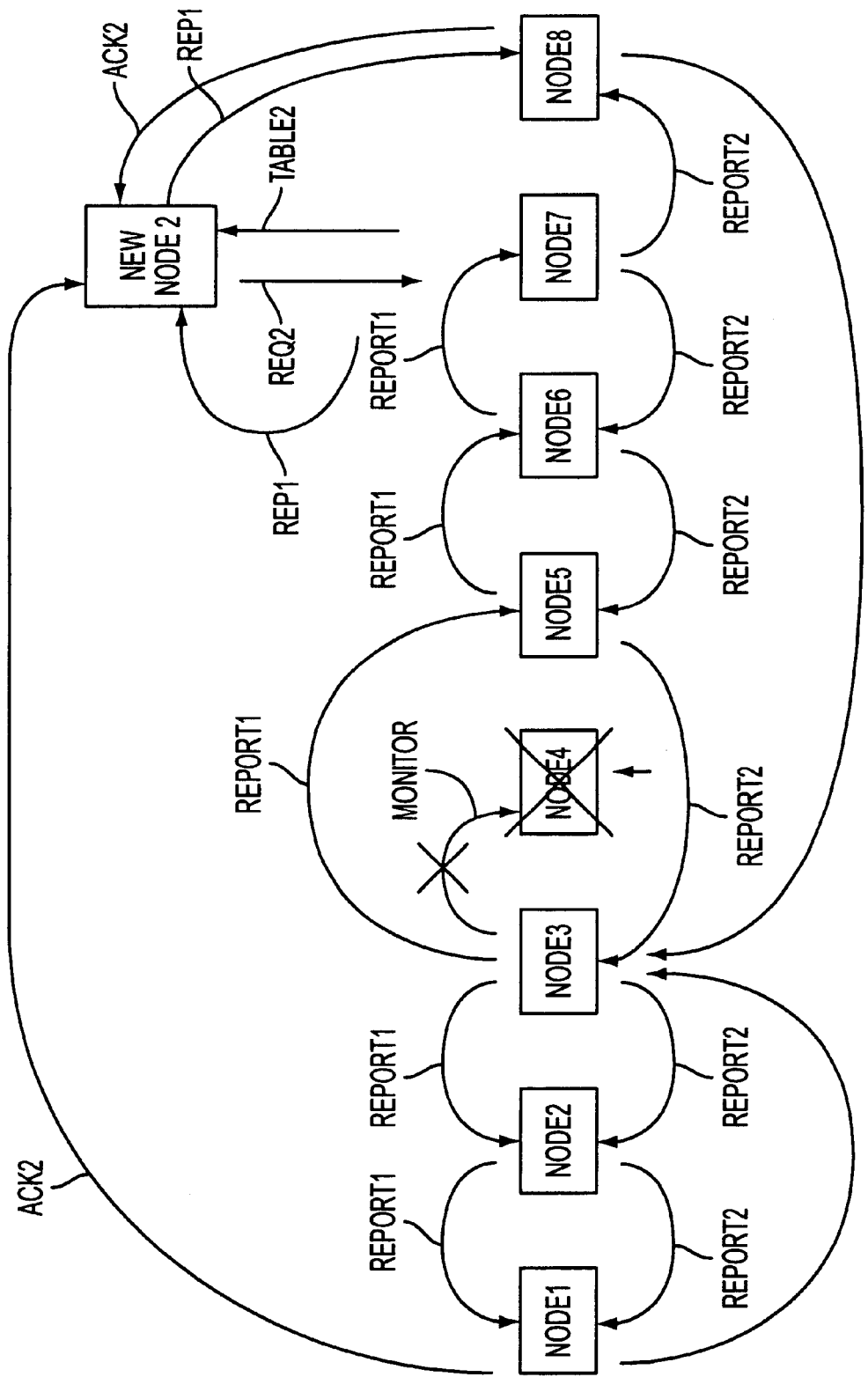
FIG. 23 is a diagram (#2) for explaining. the operation of a process for adding/deleting a plurality of nodes.

A case where, as shown in FIG. 22 or FIG. 23, the addition of a node and the deletion of a node have occurred in a LAN telephone switching system at the same time, can be considered similar to the process for adding a plurality of nodes and the process for deleting a plurality of nodes as described before.

Process for Changing a Node Number

Figure 24:
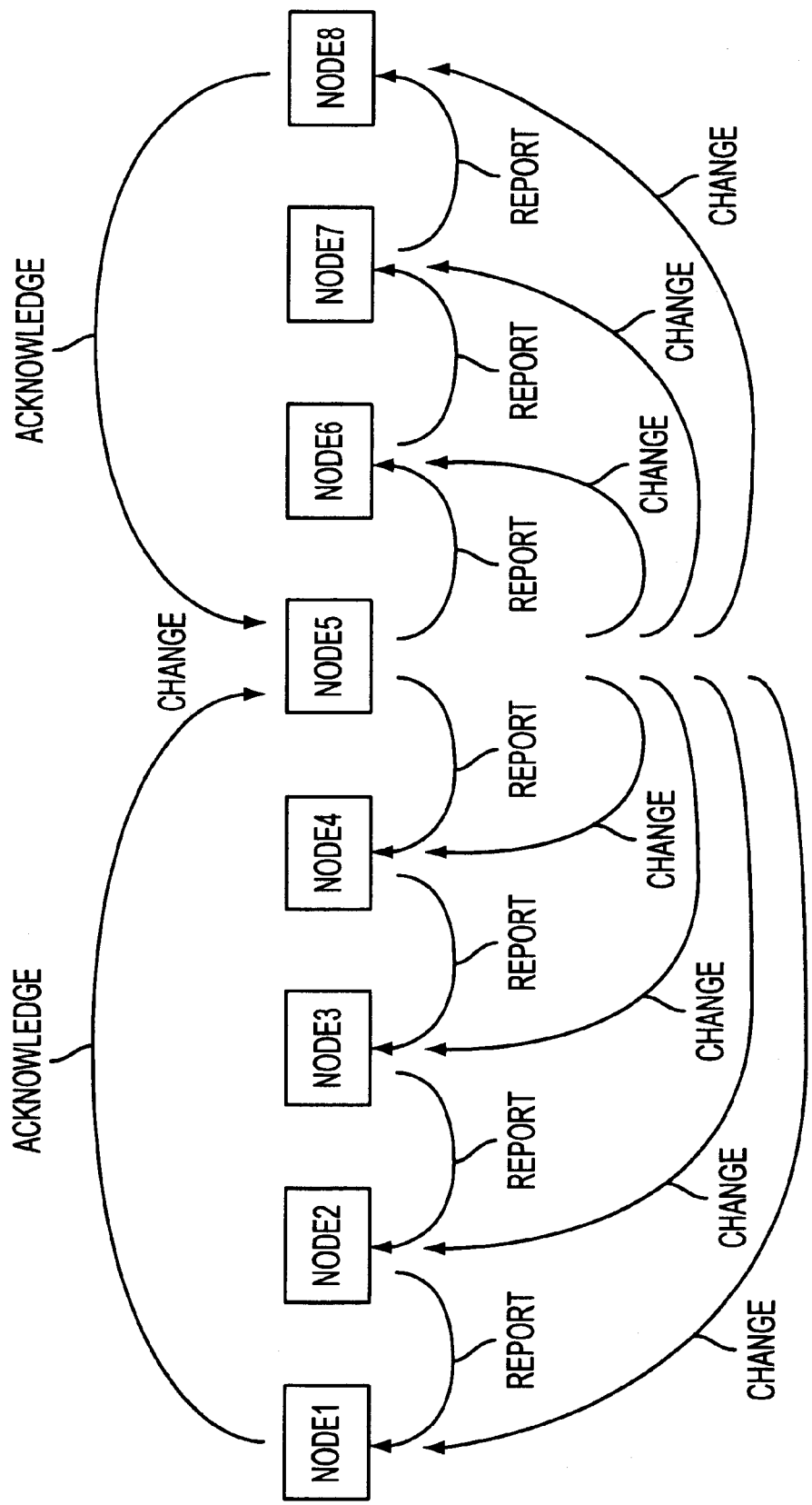
FIG. 24 is a diagram for explaining the operation of a process for changing a node number.

In a case where the node number (representative telephone number) of one node in a group has been changed, operations proceed as shown in FIG. 24. As in the case of the node deleting process described before, number change information is reported in succession (in a chain-like fashion) to the other nodes within the group in which the particular node is included, and the receipt of the number change information is acknowledged back to the source of the report, by the nodes with the highest and lowest telephone numbers.

Procedures for Intergroup Communication

Figure 25:
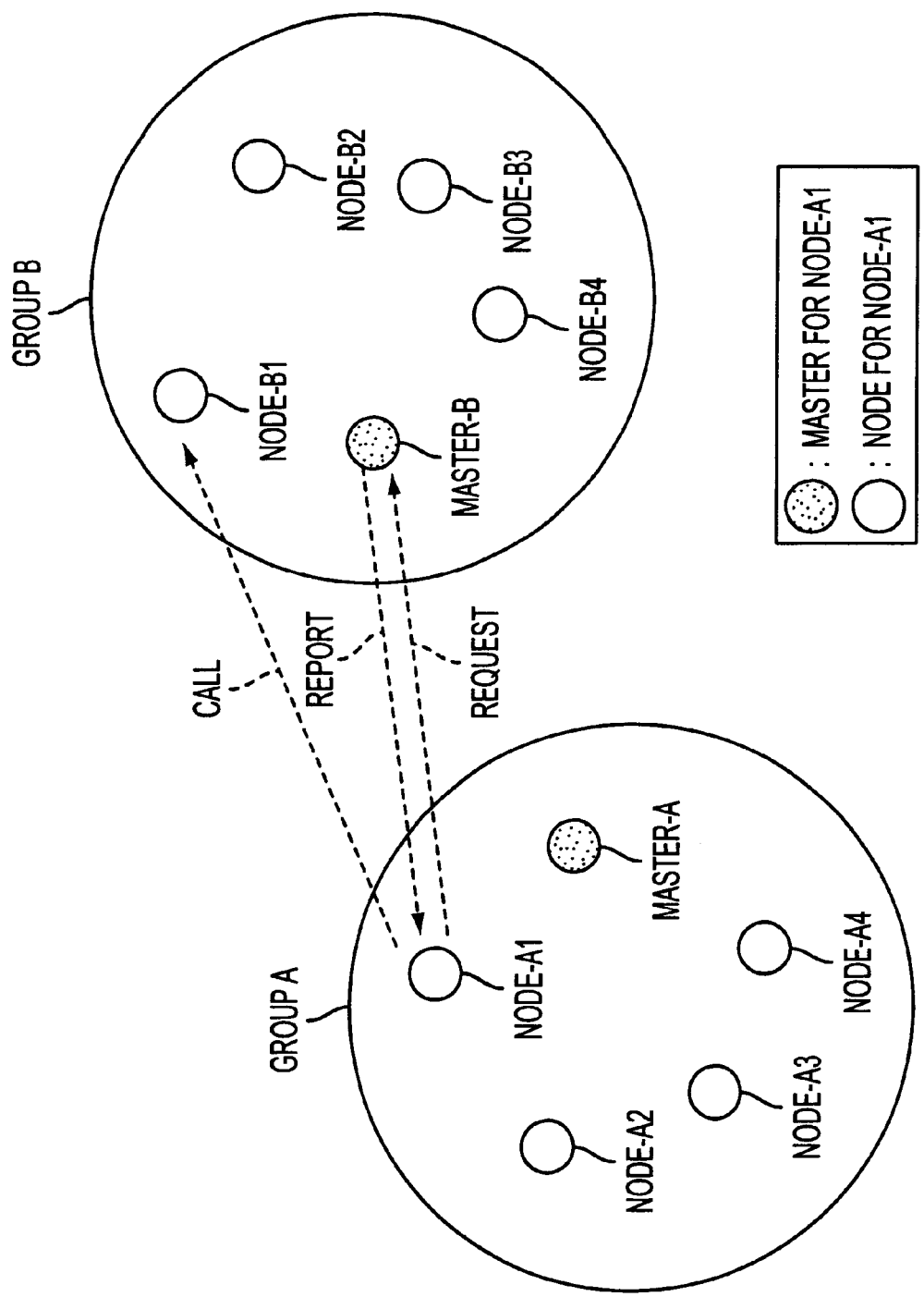
FIG. 25 is a diagram for explaining intergroup communication.
Figure 26:
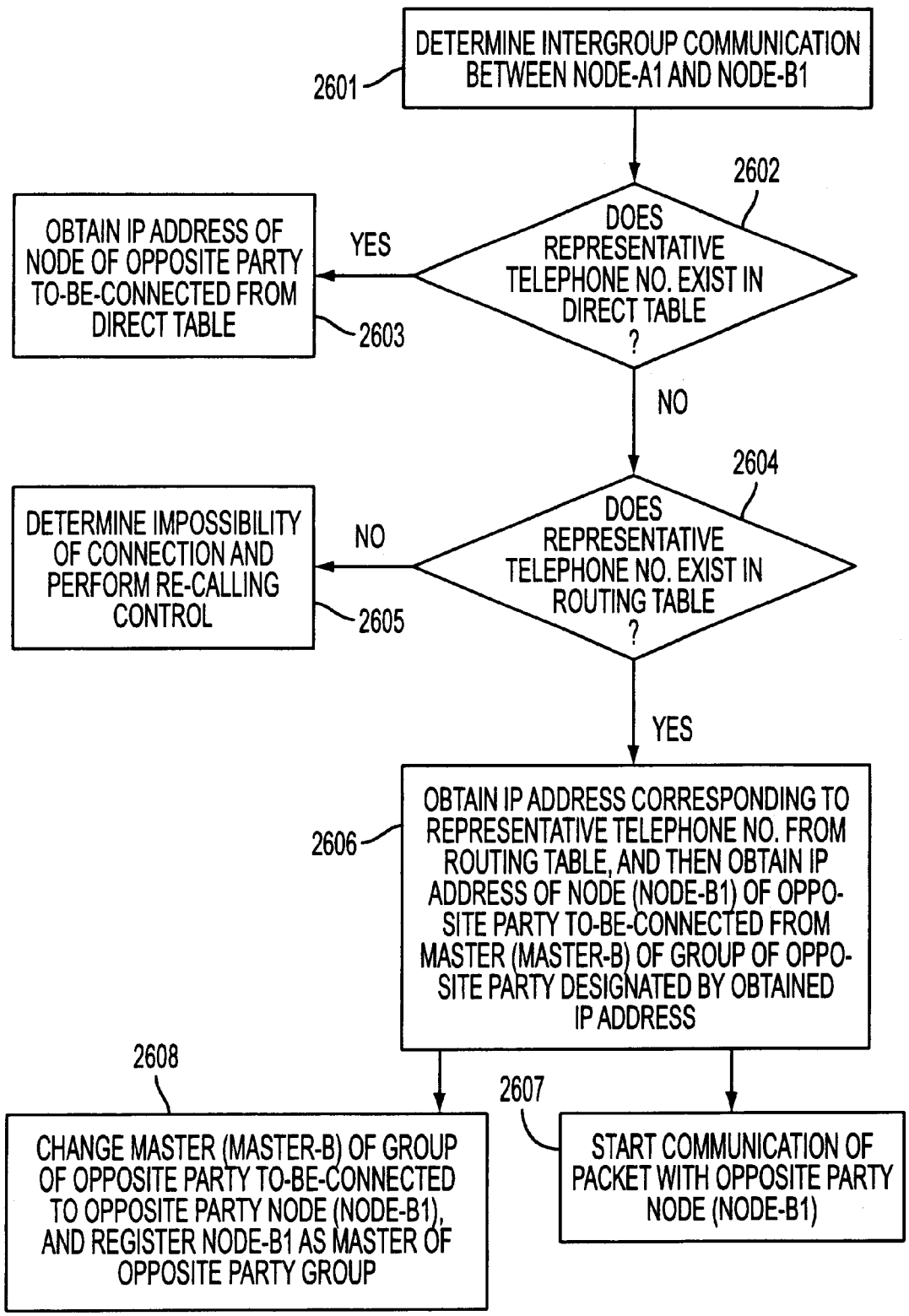
FIG. 26 is an operating flowchart showing the intergroup communication.

FIG. 25 is a diagram for explaining intergroup communication, while FIG. 26 is an operating flowchart showing a process for the intergroup communication. The process shown in the operating flowchart is executed by the address unit 307 (FIG. 3B) of each node.

As described in conjunction with FIG. 10, the address control module 320 (FIG. 3B) included in the LAN telephone switching apparatus 101 searches the table information on the basis of the destination telephone number acquired from the packet which has been received from the analog telephone set 311 or internet phone device 313, via the internet phone/data terminal accommodation module 312 or A/D conversion module 309 which is included in the line unit 308. Herein, when it has been consequently revealed that the node information corresponding to the destination telephone number does not exist in either the local table or in the group table, the packet is concluded to be used for an intergroup communication (step 2601).

In this case, as described before, the address control module 320 decides whether or not the representative telephone number exists in the direct table (refer to FIG. 7) retained in the direct table module 319 (step 1006 in FIG. 10, step 2602 in FIG. 26).

If the representative telephone number exists in the direct table, the address control module 320 acquires from the direct table the global IP address of the node in which the telephone set corresponding to the representative telephone number is accommodated (step 1006 to step 1007 in FIG. 10, step 2602 to step 2603 in FIG. 26).

On the other hand, if the representative telephone number does not exist in the direct table, the address control module 320 decides whether or not the representative telephone number exists in the routing table (refer to FIG. 6) retained in the routing table module 318 (step 1008 in FIG. 10, step 2604 in FIG. 26).

If the representative telephone number does not exist in the routing table, the address control module 320 regards the connection as being impossible and performs the re-calling control (step 1008 to step 1001 in FIG. 10, step 2604 to step 2605 in FIG. 26).

On the other hand, if the representative telephone number exists in the routing table, the address control module 320 obtains the global IP address corresponding to the representative telephone number from the routing table, and it acquires the global IP address of the node in which the telephone set corresponding to the representative telephone number is accommodated, from the master of a group designated by the obtained global IP address (step 1008 to step 1009 in FIG. 10, step 2604 to step 2606 in FIG. 26).

In the example of FIG. 25, the source node "Node A1" in a group "Group A" acquires the global IP address of the node "Node-B1" in which the destination telephone set is included, from the master "Master-B" of a group "Group B" designated by the global IP address obtained from the routing table.

As a result, the source node "Node-A1" in the group "Group A" can start the communication of the packet with the destination node "Node-B1" in the different group "Group B" (step 2607 in FIG. 26). The information transitions in this case have already been described with reference to FIGS. 11A to 11C.

On this occasion, the source node "Node-A1" in the group "Group A" registers the global IP address of the opposite party node (destination node) "Node-B1" anew as the global IP address of the master "Master-B" of the group "Group B" of the opposite party to-be-connected (destination), in the routing table (FIG. 6) retained in the routing table module 318 (step 2608 in FIG. 26). That is, the master of the group "Group B" becomes the node "Node-B1" for the node "Node-A1".

The change of the registration is made only for the source node "Node-A1" in the group "Group A", and the original master "Master-B" is still kept as the master of the group "Group B" for the other nodes. In this way, a load on searching for a telephone number address can be distributed over the whole LAN telephone network.

Process for Adding a Group

Figure 27:
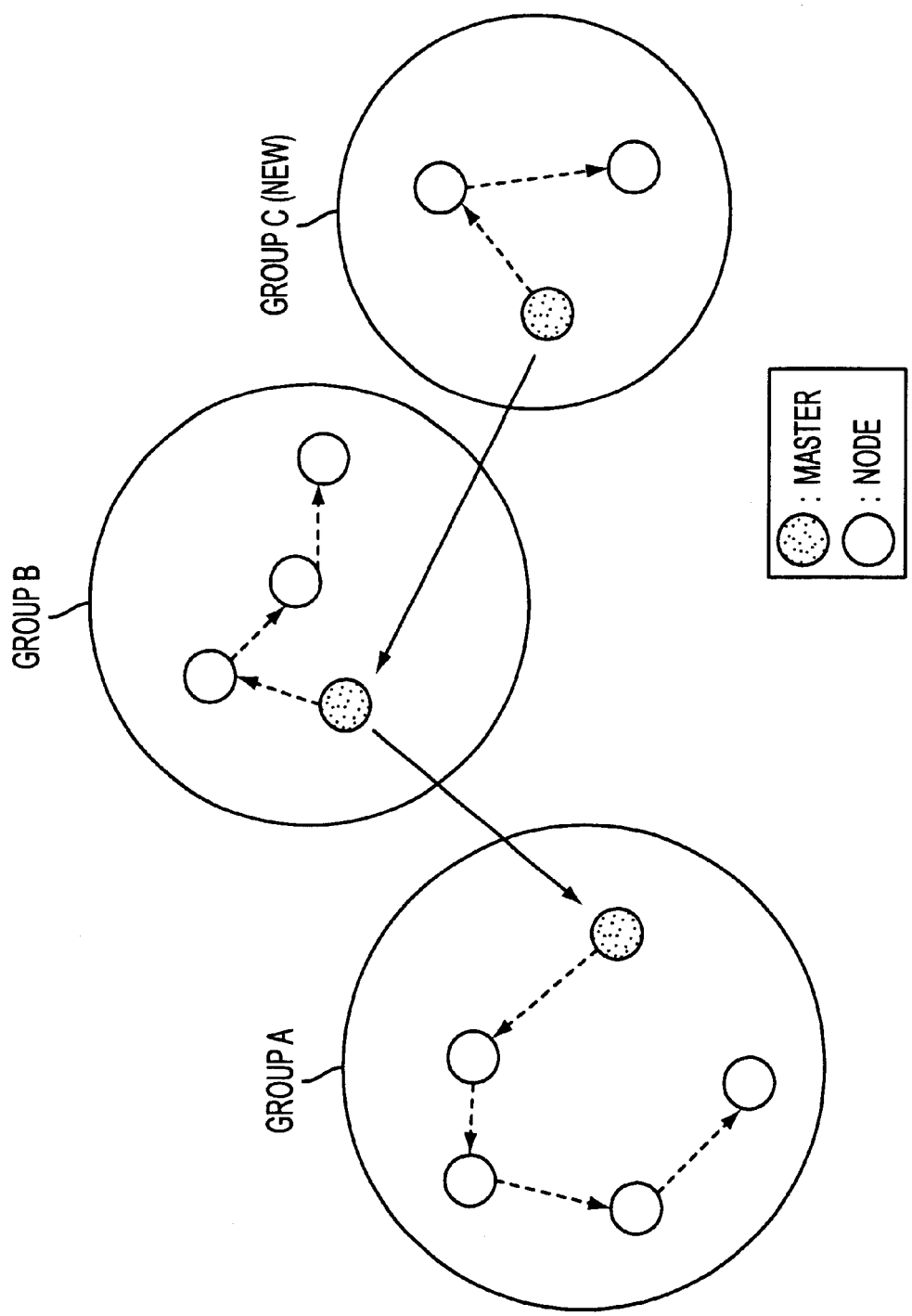
FIG. 27 is a diagram for explaining a process for adding a group.

FIG. 27 is a diagram for explaining a process for adding a group.

In a case where a group is added to a LAN telephone switching system, a master needs to be additionally registered.

On this occasion, a request for the additional registration of the group is issued to only one master included in one of groups which are already operating.

The master having permitted the additional registration reports additional registration information to the masters of the other groups in succession (in a chain-like fashion).

Besides, each of the masters having permitted the additional registration and the masters having received the report of the additional registration information reports the additional registration information of the different group to individual nodes in the group to which it belongs, in succession (in a chain-like fashion).

Process for Altering a Master

Figure 28:
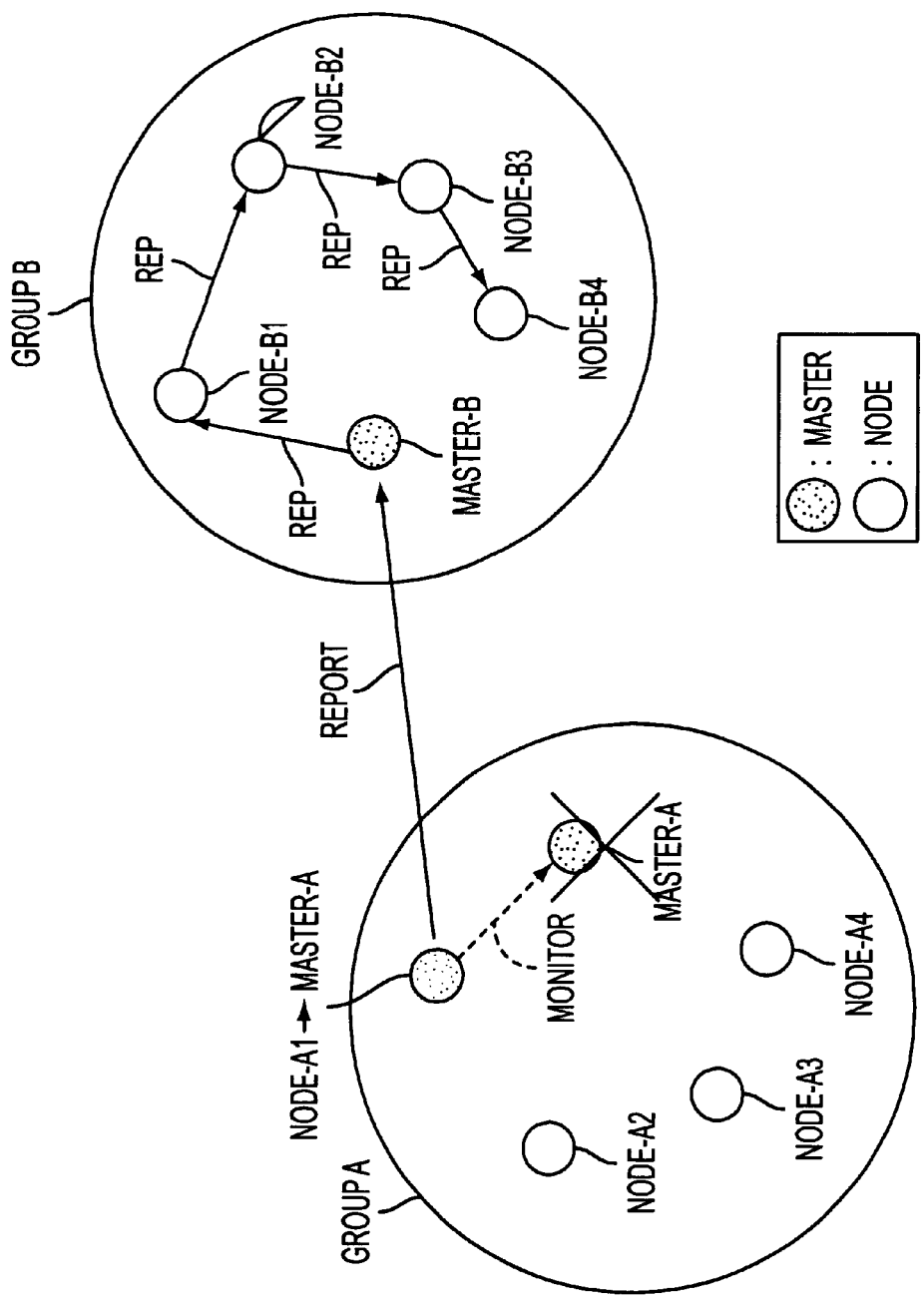
FIG. 28 is a diagram for explaining a process for altering a master.
Figure 29:
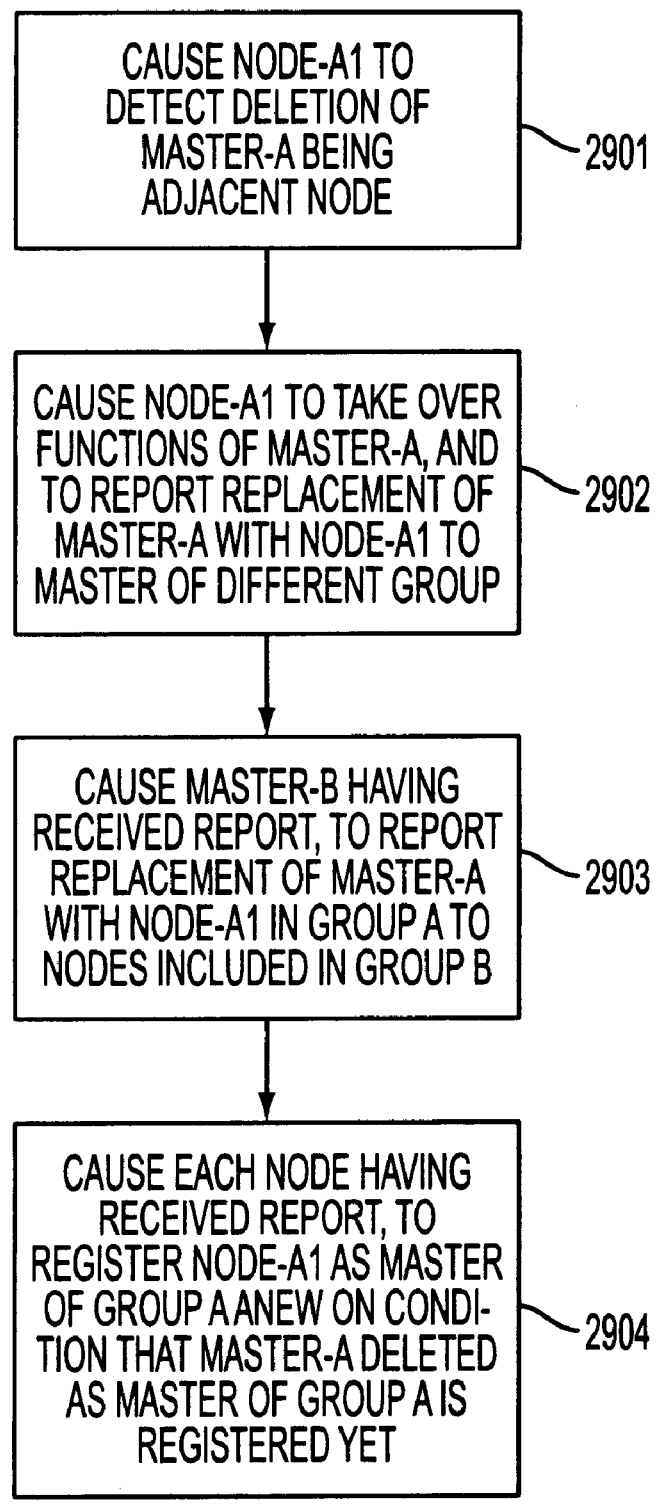
FIG. 29 is an operating flowchart showing the process for altering the master.

FIG. 28 is a diagram for explaining a process for altering a master, while FIG. 29 is an operating flowchart showing the process for altering the master. These figures illustrate an example in which the original master "Master-A" of a group "Group A" has fallen into a faulty state. Herein, a node "Node-A1" adjacent to the master "Master-A" detects the faulty state of this master, and it replaces this master and becomes the new master of the group "Group A". The state will become more apparent from steps 2901 to 2904 in FIG. 29.

Process for Deleting a Group

Figure 30:
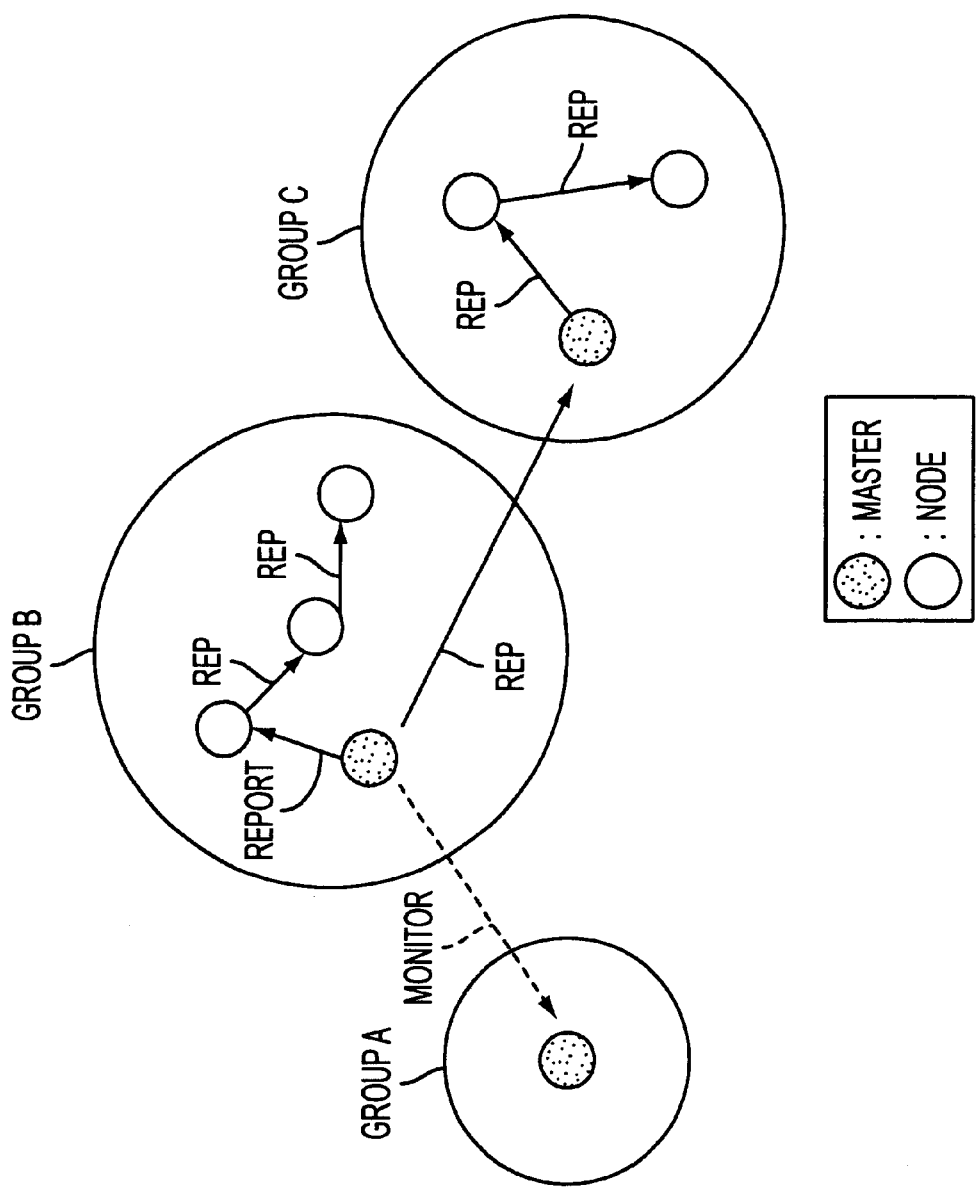
FIG. 30 is a diagram for explaining a process for deleting a group.

FIG. 30 is a diagram for explaining a process for deleting a group. It illustrates an example in which the group "Group A" is deleted. Herein, the master of a group "Group B" reports the deletion of the group "Group A" to the nodes of the group "Group B" and to the master of a group "Group C".

What is claimed is:

1. LAN telephone switching apparatus for constructing a LAN telephone switching network on a computer network, comprising:

a first network interface circuit for accommodating therein a network telephone set which has a telephone function, and which can communicate a speech signal that is stored in packets to be transferred on the computer network;

a first telephone number/network address setting circuit which correspondingly sets a telephone number and a network address being unique on the LAN telephone switching network, for said first network interface circuit; and a first packet communication circuit which performs a mutual conversion of the telephone number designated by the network telephone set and the corresponding network address, and which communicates the packets containing said network address between said computer network and said first network interface circuit.

2. A LAN telephone switching apparatus as defined in claim 1, wherein:

said first network interface circuit accommodates a data terminal equipment besides said network telephone set; and said first telephone number/network address setting circuit sets only one network address for said first network interface circuit.

3. A LAN telephone switching apparatus as defined in claim 1, wherein:

said first telephone number/network address setting circuit sets a local network address being unique only in said LAN telephone switching apparatus in which it is included, for said first network interface circuit; and a first network address conversion circuit is further comprised for performing a mutual translation of the local network address and a global network address which said LAN telephone switching apparatus possesses uniquely on said computer network, in said packets which are communicated by said first packet communication circuit.

4. A LAN telephone switching system constructed by the LAN telephone switching apparatuses as defined in claim 1, comprising:

means for giving each of said LAN telephone switching apparatuses a group of telephone numbers which are unique on said LAN telephone switching network, and a global network address which is unique on said computer network; and means for communicating packets which correspond to the network telephone sets or analog telephone sets, between said LAN telephone switching apparatuses by the use of the groups of telephone numbers and the global network addresses.

5. A LAN telephone switching system as defined in claim 4, further comprising:

means for reporting information of the group of telephone numbers and that of the global network address corresponding to the LAN telephone switching apparatus, successively to the other LAN telephone switching apparatuses, when the LAN telephone switching apparatus constituting said LAN telephone switching network has been installed on said computer network anew.

6. A LAN telephone switching system as defined in claim 4, further comprising:

means for reporting, when the LAN telephone switching apparatus constituting said LAN telephone switching network has been removed from said computer network, information of the group of telephone numbers and the global network address corresponding to the deleted LAN telephone switching apparatus, successively to the other LAN telephone switching apparatuses.

7. A LAN telephone switching system constructed by the LAN telephone switching apparatuses as defined in claim 1, comprising:

means for dividing said LAN telephone switching apparatuses constituting said LAN telephone switching system, into a plurality of groups; and means for establishing communication of packets corresponding to the network telephone sets or analog telephone sets between the groups, by accessing the LAN telephone switching apparatus which is set as a master in each of the groups.

8. A LAN telephone switching system as defined in claim 7, further comprising:

means for dynamically changing the master in said each group, corresponding to a state of the communication.

9. A LAN telephone switching apparatus for constructing a LAN telephone switching network on a computer network, comprising:

a second network interface circuit which accommodates therein an analog telephone set having an analog telephone function, and which gives the analog telephone set a telephone number being unique on the LAN telephone switching network;

a signal conversion circuit which mutually converts an analog speech signal and digital speech data that are communicated by said second network interface circuit, and which disassembles/assembles packets that contain the digital speech data and that are transferred on the computer network;

a second telephone number/network address setting circuit which correspondingly sets the telephone number and a network address, said telephone number being unique on said LAN telephone switching network and being given in said second network interface circuit connected to said signal conversion circuit; and a second packet communication circuit which mutually converts the telephone number designated by said analog telephone set and the network address corresponding thereto, and which communicates the packets containing said network address, between said computer network and said signal conversion circuit.

10. A LAN telephone switching apparatus as defined in claim 9, wherein:

said second telephone number/network address setting circuit sets a local network address being unique only in said LAN telephone switching apparatus in which it is included, for said signal conversion circuit; and further comprises a second network address conversion circuit for mutually converting the local network address and a global network address which said LAN telephone switching apparatus possesses uniquely on said computer network, in said packets which are communicated by said second packet communication circuit.

11. A LAN telephone switching system constructed by the LAN telephone switching apparatuses as defined in claim 9, comprising:

means for giving each of said LAN telephone switching apparatuses a group of telephone numbers which are unique on said LAN telephone switching network, and a global network address which is unique on said computer network; and means for communicating packets which correspond to the network telephone sets or analog telephone sets between said LAN telephone switching apparatuses, by the use of the groups of telephone numbers and the global network addresses.

12. A LAN telephone switching system as defined in claim 11, further comprising:

means for reporting information of the group of telephone numbers and that of the global network address corresponding to the LAN telephone switching apparatus, successively to the other LAN telephone switching apparatuses, when the LAN telephone switching apparatus constituting said LAN telephone switching network has been installed on said computer network anew.

13. A LAN telephone switching system as defined in claim 11, further comprising:

means for reporting, when the LAN telephone switching apparatus constituting said LAN telephone switching network has been removed from said computer network, information of the group of telephone numbers and the global network address corresponding to the removed LAN telephone switching apparatus, successively to the other LAN telephone switching apparatuses.

14. A LAN telephone switching system constructed by the LAN telephone switching apparatuses as defined in claim 9, comprising:

means for dividing said LAN telephone switching apparatuses constituting said LAN telephone switching system into a plurality of groups; and means for establishing communication of packets corresponding to specified ones of the network telephone sets or analog telephone sets between the groups, by accessing the LAN telephone switching apparatus which is set as a master in each of the groups.

15. A LAN telephone switching system as defined in claim 14, further comprising:

means for dynamically changing the master in said each group, corresponding to a state of the communication.

16. A method of constructing a LAN telephone switching apparatus for constructing a LAN telephone switching network on a computer network, comprising the steps of:

accommodating a network telephone set which has a telephone function, and which can communicate a speech signal in a state where it is stored in packets to be transferred on the computer network, setting a telephone number and a network address being-unique on the LAN telephone switching network corresponding to an accommodated position; and mutually converting the telephone number designated by said network telephone set and the network address corresponding thereto, so as to communicate the packets containing said network address between said computer network and the accommodated position of said network telephone set.

17. A LAN telephone network switching method wherein the LAN telephone switching apparatuses are constructed by the LAN telephone switching method as defined in claim 16, comprising the steps of:

giving each of said LAN telephone switching apparatuses a group of telephone numbers which are unique on said LAN telephone switching network, and a global network address which is unique on said computer network; and communicating packets corresponding to the network telephone sets or analog telephone sets between said LAN telephone switching apparatuses, by the use of the groups of telephone numbers and the global network addresses.

18. A LAN telephone network switching method as defined in claim 17, further comprising the step of:

reporting when the LAN telephone switching apparatus constituting said LAN telephone switching network has been installed on said computer network anew, information of the group of telephone numbers and the global network address corresponding to the installed LAN telephone switching apparatus, successively to the other LAN telephone switching apparatuses.

19. A LAN telephone network switching method as defined in claim 17, further comprising the step of:

reporting, when the LAN telephone switching apparatus constituting said LAN telephone switching network has been removed from said computer network, information of the group of telephone numbers and the global network address corresponding to the removed LAN telephone switching apparatus, successively to the other LAN telephone switching apparatuses.

20. A LAN telephone network constructing method wherein the LAN telephone switching apparatuses are constructed by the LAN telephone switching method as defined in claim 16, comprising the steps of:

dividing said LAN telephone switching apparatuses which constitute said LAN telephone switching network into a plurality of groups; and establishing communication of packets corresponding to the network telephone sets or analog telephone sets between the groups, by accessing the LAN telephone switching apparatus which is set as a master in each of said groups.

21. A LAN telephone network constructing method as defined in claim 20, further comprising the step of:

dynamically changing the master in said each group, corresponding to a state of the communication.

22. A method of constructing a LAN telephone switching apparatus for constructing a LAN telephone switching network on a computer network, comprising the steps of:

accommodating an analog telephone set which has an analog telephone function, and giving the analog telephone set a telephone number which is unique on the LAN telephone switching network;

mutually converting an analog speech signal and digital speech data which are communicated at an accommodated position, and disassembling/assembling packets which contain the digital speech data and which are transferred on the computer network;

correspondingly setting the telephone number given at the accommodated position which is connected to the signal/data conversion position and a network address which are unique on said LAN telephone switching network, in a position where the signal is converted; and mutually converting the telephone number designated by said analog telephone set and the network address corresponding thereto, and communicating the packets which contain said network address, between said computer network and said signal/data conversion position.

23. A LAN telephone network switching method wherein the LAN telephone switching apparatuses are constructed by the LAN telephone switching method as defined in claim 22, comprising the steps of:

giving each of said LAN telephone switching apparatuses a group of telephone numbers which are unique on said LAN telephone switching network, and a global network address which is unique on said computer network; and communicating packets corresponding to the network telephone sets or analog telephone sets between said LAN telephone switching apparatuses, by the use of the groups of telephone numbers and the global network addresses.

24. A LAN telephone network switching method as defined in claim 23, further comprising the step of:

reporting, when the LAN telephone switching apparatus which constitutes said LAN telephone switching network has been installed on said computer network anew, information of the group of telephone numbers and the global network address corresponding to the installed LAN telephone switching apparatus, successively to the other LAN telephone switching apparatuses.

25. A LAN telephone network switching method as defined in claim 23, further comprising the step of:

reporting, when the LAN telephone switching apparatus which constitutes said LAN telephone switching network has been deleted from said computer network, information items of the group of telephone numbers and the global network address corresponding to the deleted LAN telephone switching apparatus, successively to the other LAN telephone switching apparatuses.

26. A LAN telephone network constructing method wherein the LAN telephone switching apparatuses are constructed by the LAN telephone switching method as defined in claim 22, comprising the steps of:

dividing said LAN telephone switching apparatuses which constitute said LAN telephone switching network, into a plurality of groups; and establishing communication of packets corresponding to the network telephone sets and analog telephone sets between the groups, by accessing the LAN telephone switching apparatus which is set as a master in each of said groups.

27. A LAN telephone network constructing method as defined in claim 26, further comprising the step of:

dynamically changing the master in said each group, in accordance with a state of the communication.

* * * * *